(12) United States Patent
Mori

(10) Patent No.: US 6,654,020 B2
(45) Date of Patent: Nov. 25, 2003

(54) METHOD OF RENDERING MOTION BLUR IMAGE AND APPARATUS THEREFOR

(75) Inventor: Kenichi Mori, Fujisawa (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 307 days.

(21) Appl. No.: 09/891,317

(22) Filed: Jun. 27, 2001

(65) Prior Publication Data

US 2002/0027555 A1 Mar. 7, 2002

(30) Foreign Application Priority Data

Jun. 28, 2000 (JP) ........................................ 2000-194744

(51) Int. Cl.[7] .............................................. G06T 15/70
(52) U.S. Cl. ........................ 345/475; 345/473; 345/420; 345/419; 348/578
(58) Field of Search ................................ 345/419, 420, 345/473, 475, 423, 620, 624; 348/578

(56) References Cited

U.S. PATENT DOCUMENTS 5,798,764 A * 8/1998 Akiyama .................... 345/423

OTHER PUBLICATIONS

Edwin Catmull, "An Analytic Visible Surface Algorithm for Independent Pixel Processing", ACM Computer Graphics, vol. 18, No. 3, Jul. 23, 1984, pp. 109–115.

Charles W. Grant, "Integrated Analytic Spatial and Temporal Anti–Aliasing for Polyhedra in 4–Space", ACM Computer Graphics, vol. 19, No. 3, Jul. 22, 1985, pp. 79–84.

* cited by examiner

Primary Examiner—Mark Zimmerman
Assistant Examiner—Lance W. Sealey
(74) Attorney, Agent, or Firm—Oblon, Spivak, McClelland, Maier & Neustadt, P.C.

(57) ABSTRACT

A method for rendering a motion blur image comprises generating first information concerning three vertexes in a two-dimensional triangle image as an object at two points of time to obtain second information concerning six vertexes, dividing into three tetrahedrons a triangular prism formed by the six vertexes in a three-dimensional space defined by a pixel coordinate axis of the two-dimensional triangle image and a time axis, and subjecting each of the three tetrahedrons to linear processing to obtain rendering information for a motion blur image.

18 Claims, 15 Drawing Sheets

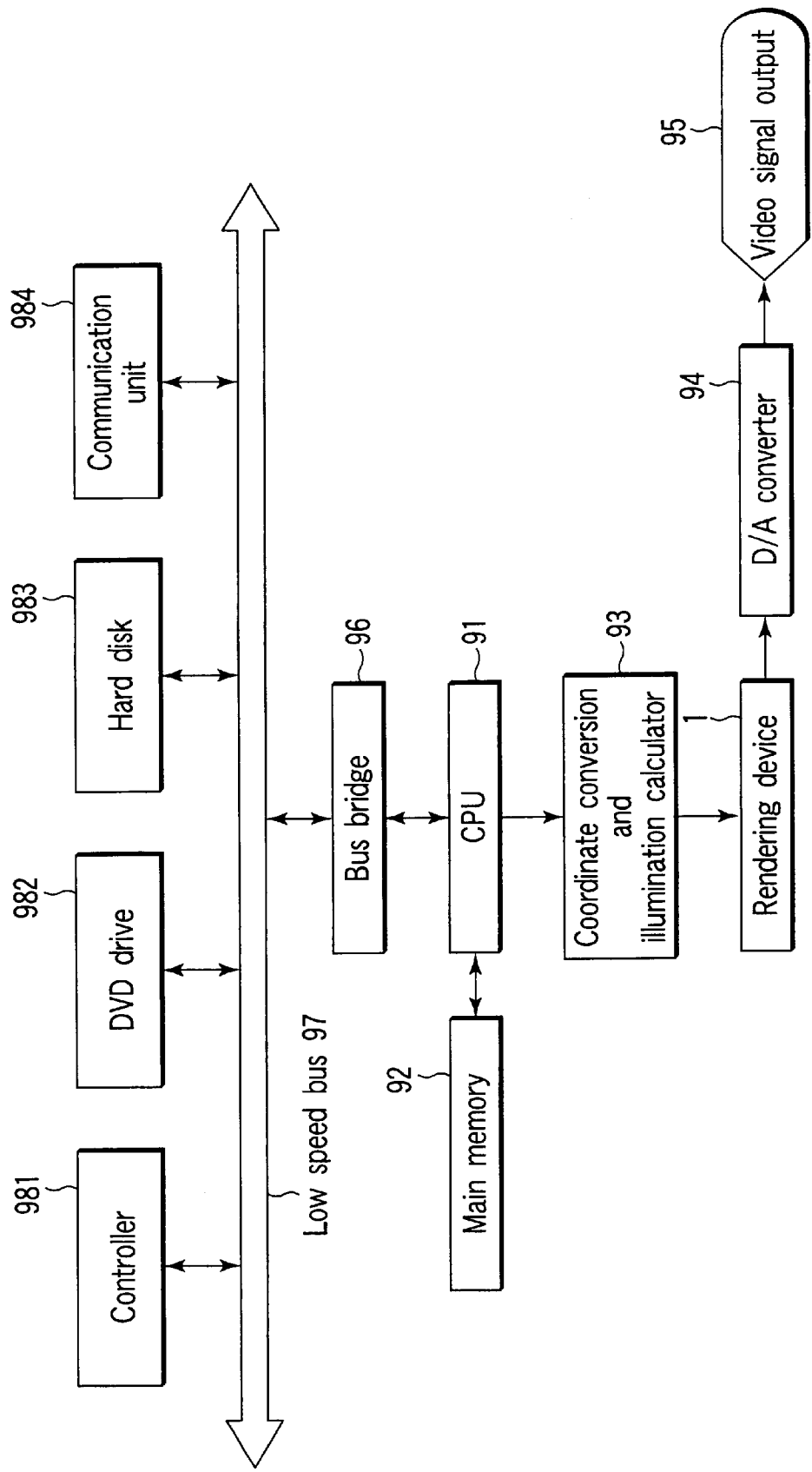
F I G. 1

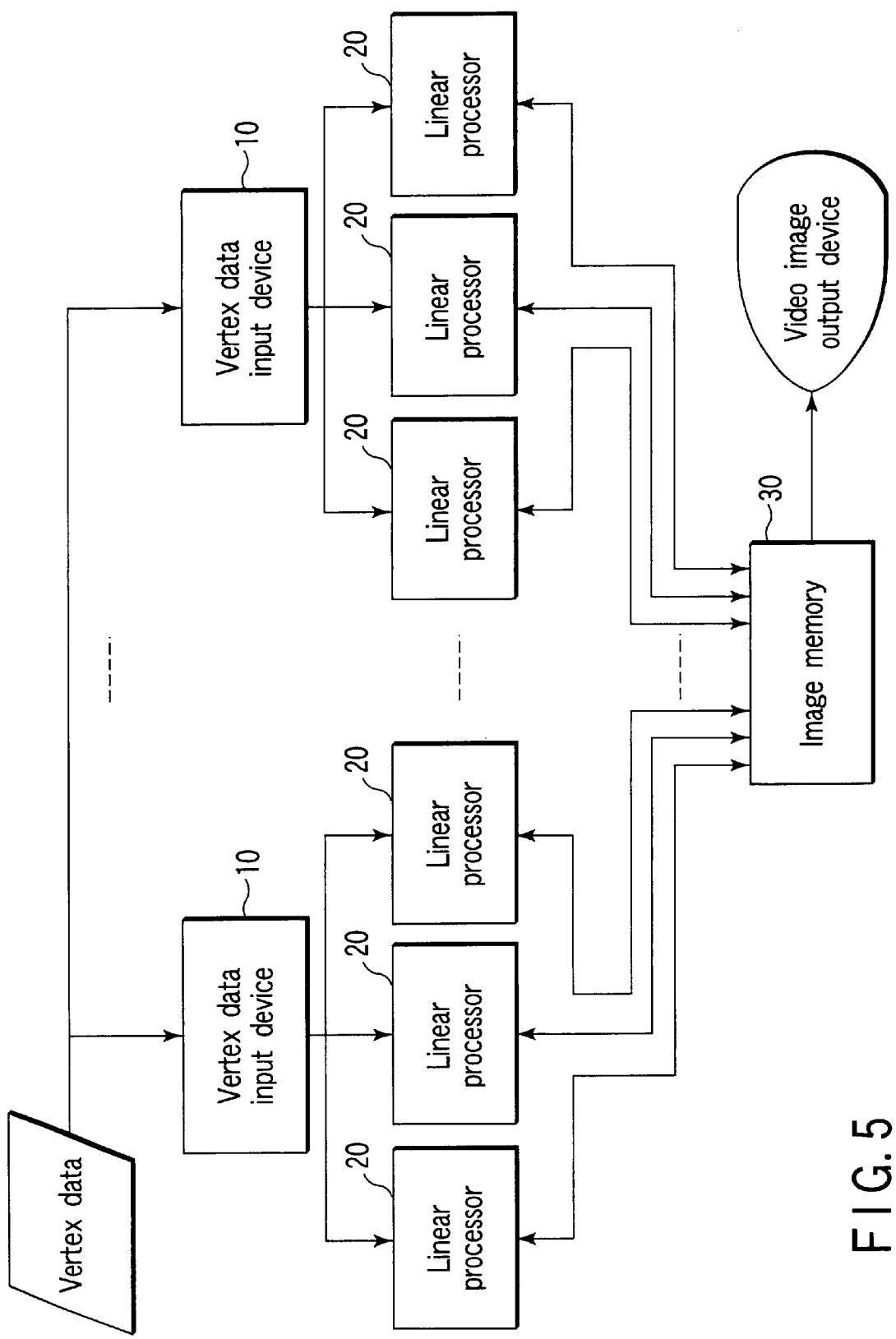
F I G. 5

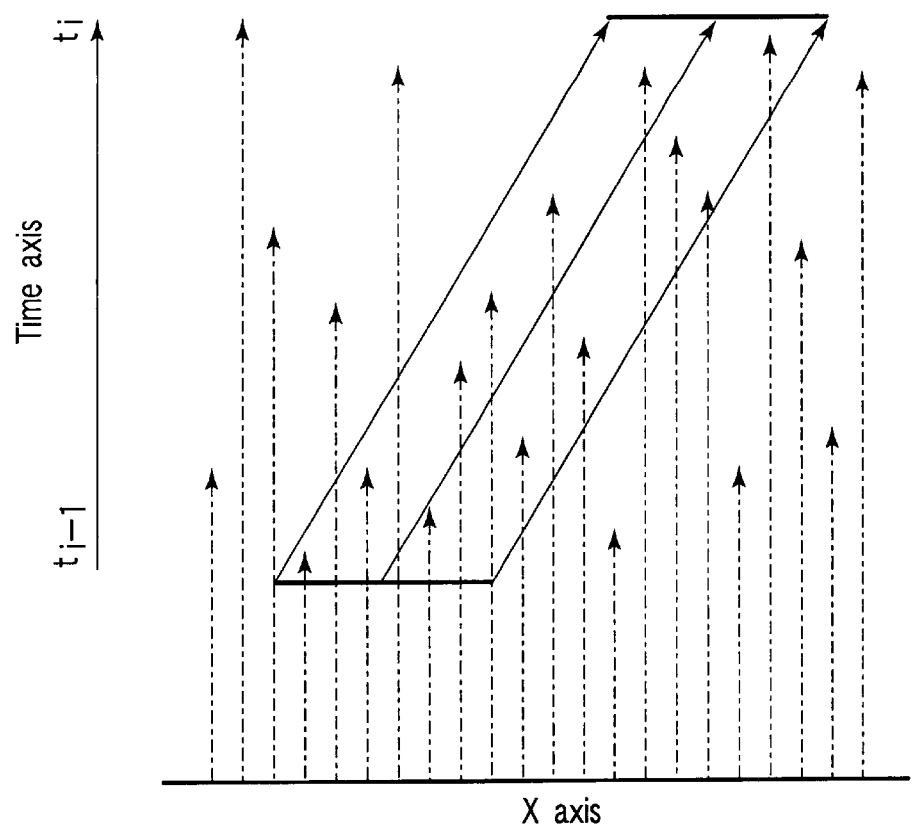
F I G. 16A
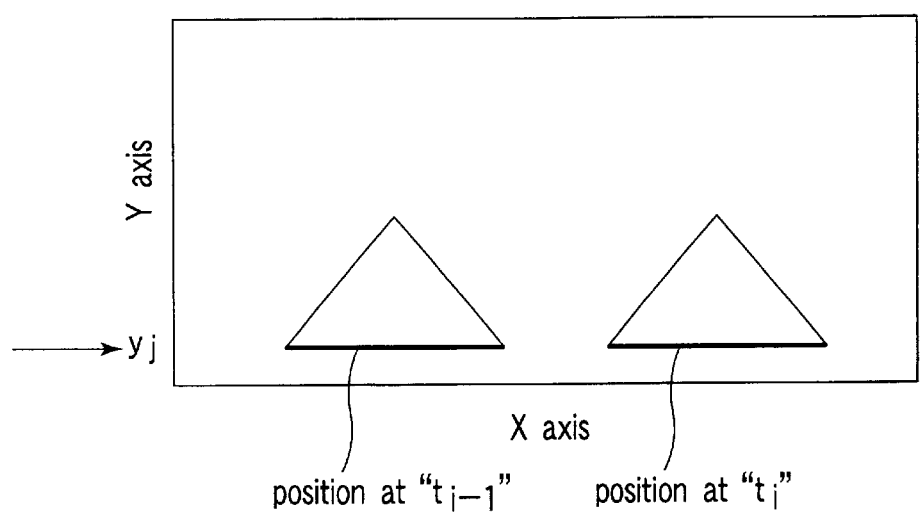
F I G. 16B

METHOD OF RENDERING MOTION BLUR IMAGE AND APPARATUS THEREFOR

CROSS-REFERENCE TO RELATED APPLICATIONS

This application is based upon and claims the benefit of priority from the prior Japanese Patent Application No. 2000-194744, filed Jun. 28, 2000, the entire contents of which are incorporated herein by reference.

BACKGROUND OF THE INVENTION

1. Field of the Invention

The present invention relates to a motion blur rendering method and apparatus for rendering a high resolution motion blur image in real time in a three-dimensional computer graphics (CG).

2. Description of the Related Art

Three-dimensional computer graphics (CG) is expanded in its applications year by year, is applied in a variety of fields, and achieves a variety of advantageous effects. Three-dimensional CG is roughly divided into two types. One type makes it possible to carry out three-dimensional CG processing using a predetermined sufficient time (when video image contents are produced by using three-dimensional CG, for example), and the other type requires three-dimensional CG processing in real time (when software such as game or simulation is executed, for example).

In a real time three-dimensional CG, there are provided various types of data including shape information or color information on polygons (triangles or polygonal shapes) for forming objects, each of which generally configures a three-dimensional space in advance (for example, stationary objects such as background or various types of objects such as movable objects represented by characters).

Here, an absolute coordinate system which a three-dimensional model has is referred to as a world coordinate system. The polygon vertex coordinate of each object is provided as a model, for example, in a (local) coordinate system specific to the object, and is converted into the world coordinate system by means of conversion processing. A stationary object can be expressed by the world coordinate system from the start. In addition, a display screen on a display is referred to as a screen, and its coordinate system is referred to as a screen coordinate system. An object existing in the world coordinate system is projected and rendered on the screen coordinate system (specified at a predetermined point of view).

During rendering, the following processes are generally carried out.

(1) The allocation or the like of each object in the world coordinate system at a predetermined timing is computed (with processing or the like being applied to such each object as required);

(2) The three-dimensional coordinate value of each vertex of a polygon in the world coordinate system is converted into a two-dimensional coordinate value when it is projected on the screen coordinate system, and color information on each vertex is computed;

(3) Depicting data is computed based on attribute information concerning the two-dimensional coordinate value of each vertex of each polygon in the screen coordinate system and the depth of each vertex or information concerning color, and an image for one screen is generated; and (4) The thus generated image is converted into a video signal by means of a D/A converter, for example, and the converted signal is outputted to a television screen or the like.

These processes are repeatedly carried out with predetermined time intervals, whereby a motion image caused by three-dimensional CG is displayed. In addition, a user operates a point of view by using a controller or the like or moves a position of a specific character which is a base for determining the point of view, whereby an image is obtained so as to view a three-dimensional model at a desired position and angle or move the inside of the three-dimensional model.

As described above, in general, in a computer graphics apparatus, a still image is rendered with predetermined time intervals, and the rendered image is continuously viewed to be thereby recognized as a motion image with human eyes. However, in this method, in the case where a fast moving object is rendered, human eyes can sense that the positions of the same object are significantly different from each other between the adjacent screens. Because of this, such fast moving object is seen as strobe projected movement instead of smooth movement.

A technique for rendering a fast moving object with high resolution includes rendering an afterimage effect called "a motion blur". This motion blur is very often used in computer graphics such as movies in which there is no need to compute an image in real time. However, in a conventional read time computer graphics apparatus, an image must be computed within a limited period of time, and thus, the motion blur has not been employed.

A method employed in a high performance, real time computer graphics apparatus in recent years is a technique called "Multi-path Rendering" in which still images at a plurality of times further segmented within a single frame time are computed and obtained, and these images are superimposed in one screen. With this method, a plurality of strobes are considered as being light emitted within a single frame time. In this method, an increased number of strobes within a single frame time can improve image quality more remarkably.

However, in this technique, there is a disadvantage that all the graphics processes including coordinate conversion are required by the number of strobes, and the number of computations required for rendering is increased in proportion to the number of strobes. In reality, although two or three strobes can be used within a single frame time, the boundary or end side of an object appears on an image, a smooth motion blur image is not produced, and a sufficient advantageous effect cannot be attained.

A motion blur technique for computing an afterimage effect is important in order to generate a speedier, more dynamic and realer motion image with real time computer graphics.

However, in the conventional technique "Multi-path Rendering", there increases a computation amount of all the graphics processes including coordinate conversion processing caused by a CPU and a coordinate conversion/illumination calculator 93, and such high resolution motion blur cannot be computed.

BRIEF SUMMARY OF THE INVENTION

The present invention has been made in order to solve the foregoing problem. It is an object of the present invention to provide a motion blur image rendering method and apparatus capable of high resolution motion blur by a smaller computation amount of rendering process.

According to the first aspect of the present invention, there is provided a motion blur image rendering method for a three-dimensional computer graphics, the method comprising: generating first information concerning three vertexes in a two-dimensional triangle image as an object at two points of time to obtain second information concerning six vertexes; dividing into three tetrahedrons a triangular prism formed by the six vertexes in a three-dimensional space defined by a pixel coordinate axis of the two-dimensional triangle image and a time axis; and subjecting each of the three tetrahedrons to linear processing to obtain rendering information for a motion blur image.

According to the second aspect of the present invention, there is provided a motion blur image rendering method for a three-dimensional computer graphics comprising: generating two-dimensional coordinate values of three vertexes of a two-dimensional triangle as an object at two points of time to acquire information concerning six vertexes and attribute information on each of the vertexes, the triangle being extracted from a projection image formed when a three-dimensional model is projected onto a two-dimensional plane; dividing into three tetrahedrons a triangular prism formed by the six vertexes in a three-dimensional space defined by pixel coordinate axes of the two-dimensional triangle and a time axis; and subjecting each of the tetrahedrons to linear processing in the three-dimensional space using four vertexes extracted from among the six vertexes, the three-dimensional space being based on the two-dimensional coordinate values, the attribute information and the two points of time, to obtain rendering information for a motion blur image.

According to the third aspect of the present invention, there is provided a rendering apparatus rendering a motion blur image comprising: a generating device configured to generate information concerning three vertexes in a two-dimensional triangle image as an object at two points of time, to acquire information concerning six vertexes; a dividing device configured to divide into three tetrahedrons a triangular prism defined by the six vertexes in a three-dimensional space defined by a pixel coordinate axis and a time axis of the two-dimensional image; and a linear processing device configured to subject each of the three tetrahedrons to linear processing, to obtain rendering information for a motion blur image.

According to the fourth aspect of the present invention, there is provided a rendering apparatus rendering a motion blur image comprising: a generating device configured to generate two-dimensional coordinate values of three vertexes of a two-dimensional triangle as an object at two points of time to acquire information concerning six vertexes and attribute information on each of the vertexes, the two-dimensional triangle being extracted from a projection image formed when a three-dimensional model is projected onto a two-dimensional plane; a dividing device configured to divide into three tetrahedrons a triangular prism defined by the six vertexes in a three-dimensional space defined by a pixel coordinate axis of the two-dimensional image and a time axis; and a linear processing device configured to subject each of the tetrahedrons to linear processing in the three-dimensional space using four vertexes extracted from among the six vertexes and based on the two-dimensional coordinate values, the attribute information and the two points of time, to obtain rendering information for a motion blur image.

According to the fifth aspect of the present invention, there is provided a computer program stored on a computer readable medium for rendering a motion blur image in a three-dimensional computer graphics, the computer program comprising instruction means for instructing a computer to generate first information concerning three vertexes in a two-dimensional triangle image as an object at two points of time to obtain second information concerning six vertexes, instruction means for instructing the computer to divide into three tetrahedrons a triangular prism formed by the six vertexes in a three-dimensional space defined by a pixel coordinate axis of the two-dimensional triangle image and a time axis, and instruction means for instructing the computer to subject each of the three tetrahedrons to linear processing to obtain rendering information for a motion blur image.

BRIEF DESCRIPTION OF THE SEVERAL VIEWS OF THE DRAWING

FIG. 1 is a view showing an exemplary configuration of the entire rendering processing system according to one embodiment of the present invention;

FIG. 5 is a block diagram rendering a fourth rendering device according to the same embodiment;

FIGS. 16A and 16B are views each illustrating sampling in the rendering apparatus according to the same embodiment;

DETAILED DESCRIPTION OF THE INVENTION

Figure 2:
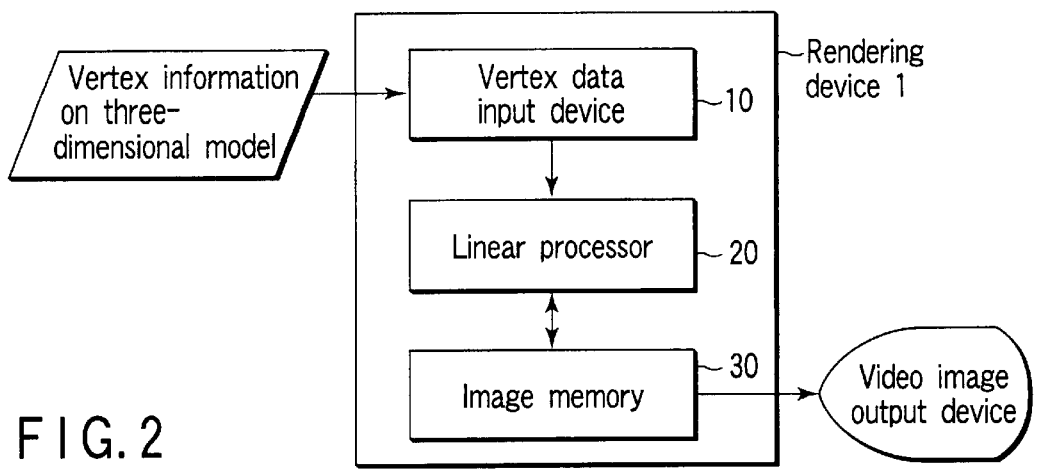
FIG. 2 is a block diagram rendering a first rendering device according to the same embodiment.

Hereinafter, preferred embodiments of the present invention will be described with reference to the accompanying drawings.

FIG. 1 shows an exemplary configuration of the entire rendering processing system according to the present embodiment.

This system is for enabling to render a high resolution motion blur image.

This system can be configured as an exclusive machine such as a so called game machine having its real time three-dimensional CG function, and can be configured so as to execute software on a general-purpose computer. In addition, in any case, required processes can be achieved by software, and part or all of these processes can be configured by hardware.

As shown in FIG. 1, in this system, a controller 981, a DVD drive 982, a hard disk drive 983, and a communication unit 984 are connected to a low speed bus 97, and a CPU 91 is connected to the bus via a bus bridge 96.

In FIG. 1, for example, a medium (DVD) set to a DVD drive 982 stores application software such as game (program portion or various types of data such as shape information or color information on s polygon (triangle or polygonal shape) that forms an object such as stationary object or characters, for example, in a three-dimensional model and color information). Alternatively, for example, a hard disk 983 stores application software or the like acquired via a network by means of a communication unit 984.

All or required part of this application software or the like is loaded in a main memory 92 at a predetermined or required timing, and a CPU 91 undergoes processing based on the contents of the main memory 92. At this time, various types of data concerning an object that configures a three-dimensional space is subjected to processing or conversion as required, and data having a three-dimensional coordinate value in the world coordinate system is sent to a coordinate conversion and illumination calculator 93.

The coordinate conversion and illumination calculator 93 carries out conversion into a two-dimensional coordinate value when the three-dimensional coordinate value in the world coordinate system of each vertex of each polygon of an object is projected on a screen coordinate system (specified at a predetermined point of view) or calculation of color information on each vertex. These items of data are sent to a rendering device 1.

The rendering device 1 computes rendering data based on the two-dimensional coordinate value of each vertex of each polygon in the screen coordinate system and attribute information such as information concerning the depth of each vertex or information concerning color, and generates an image for one screen.

The generated image is converted into a video signal 95 by means of a D/A converter 94, for example, and the converted signal is outputted to a display (not shown).

These processes are repeatedly performed with predetermined time intervals, whereby a motion image caused by a three-dimensional CG is displayed. In addition, a user operates a point of view by using a controller 1 or the like or moving a position of a specific character which is a base for determining the point of view, whereby an image is obtained so as to view three-dimensional model at a desired position or angle or to move the inside of the three-dimensional model.

As data input/output means, only part of the DVD drive 982, hard disk drive 983, and communication unit 984 may be connected. In addition, in addition to all or part of the DVD drive 982, hard disk drive 983, and communication unit 984 or in place of them, another drive or interface and the like may be connected.

In addition, as an input device for user operation, in addition to a controller 981 or in place of the controller an input/output device such as keyboard or mouse may be connected.

Further, a display may be a specific display integrated with the system, may be a television screen of a TV receiver, or may be a computer display.

Furthermore, the coordinate conversion and illumination calculator 93 is implemented by hardware or software. In the case where the calculated is implemented by hardware, it is desirable to provide one or plural CPUs specific to the coordination conversion and illumination calculator 93 other than CPU 91. Of course, the CPU 91 can be used intact if it has its high capability. This applies to the rendering device 1 as well. In the case where the coordinate conversion and illumination calculator 93 and the rendering device 1 are implemented by software, it is possible to provide one or plural CPUs other than CPU 91.

This system may incorporate hardware/software for reproduction processing of voice synchronized with a video image or speaker and the like.

Hereinafter, the present embodiment will be described in detail by focusing on processing concerning a motion blur. Of course, this system makes it possible to carry out desired three-dimensional CG processing other than motion blur.

First, a concept of time and motion image generation will be described here.

An interval for displaying an image is referred to as a "frame". Although 1/24 second is employed for one frame in a film image, 1/30 second or 1/60 second is generally employed in a rendering apparatus for outputting an image to a television. Processing for generating and displaying one display image is continued relevant to each frame, whereby a motion image is displayed.

In general, a three-dimensional computer graphics rendering apparatus represents a three-dimensional model as a set of polygons (triangles or polygonal shapes), and reads information concerning the vertexes of each polygon. In the present embodiment, with respect to a polygon desired to be motion blurred, vertex information on two points of time (coordinate value in the vertex screen coordinate system and attribute information such as color information or depth information) are read relevant to each vertex of the polygon. Examples of two points of time include a frame start time and end time or current frame start time and next frame start time. Hereinafter, as an example, when an image of one point of time "ti" is generated, vertex information on that time "t" and vertex information on time "ti−1" before one frame time are employed for a polygon desired to be motion blurred.

In the case where it is assumed that a sufficient memory for the rendering device 1 cannot be allocated, when the rendering device 1 generates an image of predetermined time "ti", vertex information on the time "ti" and vertex information on time "ti−1" are generated respectively so as to be posted from the coordinate conversion and illumination calculator 93 to the rendering device 1.

Irrespective of whether or not there exists a polygon desired to be motion blurred in the time screen, the information for two points of time may be posed from the coordinate conversion and illumination calculator 93 to the rendering device 1. When there is no polygon desired to be motion blurred, there can be employed a method for posting information for such one point of time from the coordinate conversion and illumination calculator 93 to the rendering device 1. Alternatively, only with respect to a polygon desired to be motion blurred, there can employed a method for posting vertex information on time before a single frame time from the coordinate conversion and illumination calculator 93 to the rendering device 1.

In generating an image of the starting screen (on which time "t1" is defined), vertex information on the time "t1" is posted from the coordination conversion and illumination calculator 93 to the rendering device 1 (because there is no data on the preceding time). In this case, the above information may be handled as the absence of polygon desired to be motion blurred. In addition, there can be employed a method of posting vertex information on the time "t1" as vertex information at a time before a single frame time.

In the case where it is assumed that a sufficient memory for the rendering device 1 can be allocated, vertex information on time "t1" is posed from the coordinate conversion and illumination calculator 93 to the rendering device 1 so that vertex information on time "ti−1" before at least such single frame time may be temporarily stored in a memory on the rendering device 1.

The present embodiment will be described by way of showing an example of the former case.

An instruction of whether or not motion blur is carried out in an image of a predetermined time is assigned for each object. The information on this instruction is included in application or the like. For example, the above information is added as object attribute information, and is stored in a main memory 92 during execution.

The contents (modes) of a motion blur are made available from among a plurality of types so that any one of the available modes can be specified. This mode may be specified in units of screen, may be specified in units of a part of the screen, may be specified in units of objects, may be specified in units of object groups, or may be specified by the other various methods. A motion blur mode can be differentiated by changing the contents of a conversion table or conversion function, for example, as described later. When the motion blur mode is specified, for example, plural types of conversion tables or conversion functions are provided in advance, whereby an available conversion table or conversion function may be specified. Data on the conversion table or conversion function is provided instead of providing a conversion table or conversion function, whereby the mode may be specified. Both of these two methods may be possible. Information for specifying a motion blur mode is also contained in application or the like, and is stored in the main memory 92 during execution.

Further, the user (for example, the game player) may enable settings of, and supplying instructions on, motion blur. There is a variety of settings including ON/OFF setting of motion blur relevant to the entire application or the like, setting concerning adjustment of strong or weak effect on motion blur, setting concerning motion blur mode preference. In such a case, motion blur processing is performed in consideration of the users settings. Of course, it is possible to preset whether or not the user settings are considered according to a scene of a video image and to provide a control in accordance with such user settings.

FIG. 2 shows a first exemplary configuration of a rendering device 1 according to the present embodiment.

This rendering device 1 comprises an vertex data input device 10, a linear processor 20, an image memory 30.

The vertex data input device 10 has an input function for reading vertex information on a three-dimensional model and a dividing function for dividing the model into tetrahedrons. The linear processor 20 carries out linear processing to obtain rendering information, and carries out rendering into the image memory. The image memory 30 holds image data, and outputs the image data to a video image output device.

In the present embodiment, as described later in detail, processing for motion blur is carried out in units of triangles, and linear processing caused by the linear processor 20 is carried out three times for the purpose of processing for rendering one triangle to be motion blurred (a triangular prism formed of the screen coordinate of a total of six vertexes of triangles at given two points of time and the coordinate on the time axis is divided into three tetrahedrons, and processing is carried out for such each tetrahedron).

Figure 3:
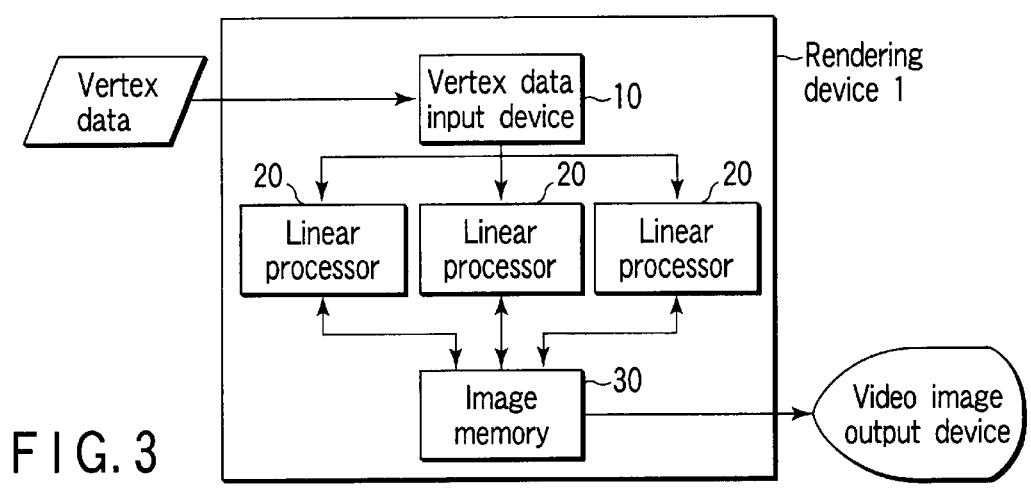
FIG. 3 is a block diagram rendering a second rendering device according to the same embodiment.

FIG. 3 shows a second exemplary configuration of the rendering apparatus according to the present embodiment.

In FIG. 3, three linear processors 20 are provided, thereby making it possible to perform linear processing in parallel.

In this case, parallel processing can be carried out, for example, by executing three processes a1, a2, and a3 for a predetermined triangle "a", executing three processes b1, b2, and b3 for the next triangle "b", and executing three processes c1, c2, and c3 for the second next triangle "c". In addition, batch-like parallel processing can also be carried out, for example, by first executing processes a1, b1, and c1, then executing processes a2, b2, and c2, and then, executing processes a3, b3, and c3. Further, pipeline-like parallel processing can be carried out, for example, by executing processes a3, b2, and c1, processes d1, b3, and c2, processes d2, e1, and c3, and processes d3, e2, and f1.

Of course, any other parallel processing method can be employed.

Figure 4:
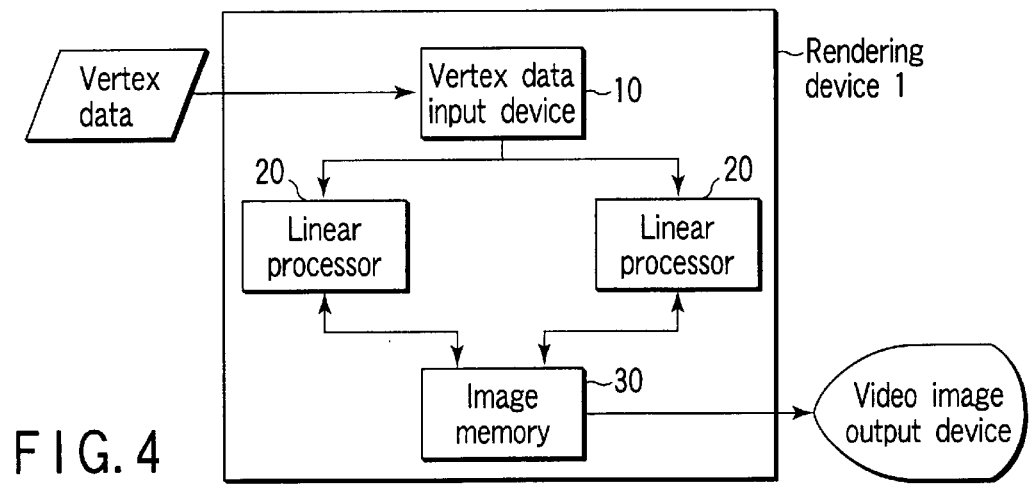
FIG. 4 is a block diagram rendering a third rendering device according to the same embodiment.

FIG. 4 shows a third rendering device according to the present embodiment.

In FIG. 4, two linear processors 20 are provided, thereby making it possible to perform linear processing in parallel.

In this case, parallel processing can be carried out, for example, by executing processes a1, a2, and a3, then executing processes b1, b2, and b3. In addition, parallel processing can be carried out, for example, by executing processes a1 and a2, processes b3 and b3, and processes b2 and b3. Further, parallel processing can be carried out, for example, by executing processes a1 and b1, processes a2 and b2, and processes a3 and b3.

Of course, any other parallel processing method can be employed.

Of course, a fourth exemplary configuration having four or more linearization processors 20 can be provided. In this case as well, a variety of parallel processing methods can be employed.

FIG. 5 shows a fourth rendering device according to the present embodiment.

A plurality of sets of one vertex data input device and one or more linear processors in the previously described embodiment may be provided (FIG. 5 shows an example when three linear processors are included in one set).

Figure 6:
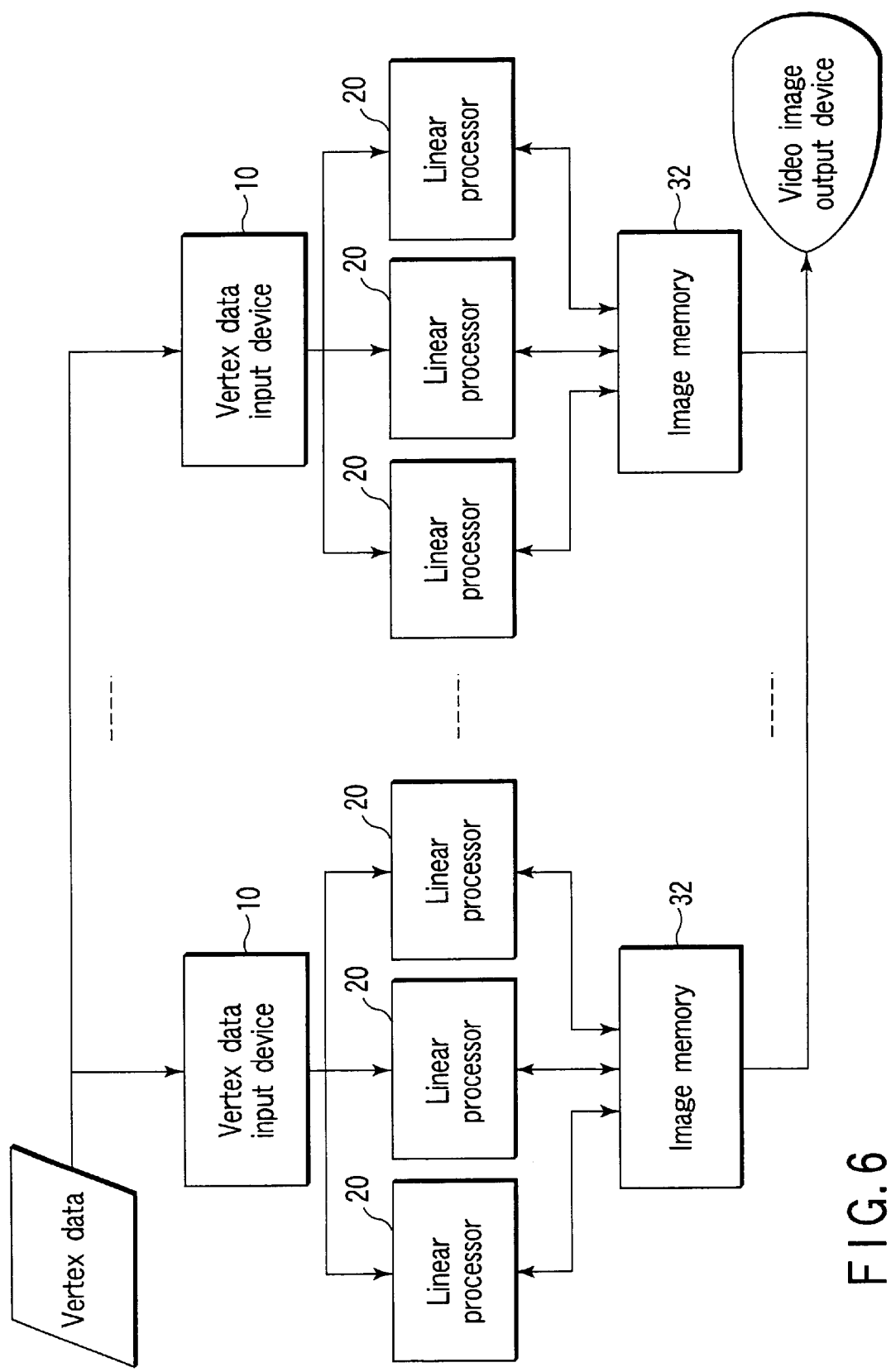
FIG. 6 is a block diagram rendering a fifth rendering device according to the same embodiment.

FIG. 6 shows a fifth rendering device according to the present embodiment.

The fifth rendering device is such that plural sets of image memories are provided in the fourth rendering device (FIG. 6 shows an example when three linear processors are included in one set).

In this case, such plurality sets of memories may share their roles. For example, in the case where four sets of image memories are provided, each set is responsible for a ¼ portion of any one of the upper left, upper right, lower right, and lower left from among all the screen regions (an image of the responsible ¼ portion of all the screen regions is written in the image memory of each set. The image memory of each set may be the same size equivalent to ¼ of all the screen regions). In addition, processing is shared in units of objects for each of the plural sets, for example (although the image memory of each set is the same size covering all the screen regions, an image of the responsible object is written in the image memory of each set). In this case, a plurality of images contained in the image memory are combined to be outputted as one image.

Hereinafter, a flow of processing of the rendering apparatus 1 will be described.

To an vertex data input device 10, vertex information on each vertex that configures each polygon (triangle or polygonal shape) configuring a three-dimensional model is inputted relevant to two points of time. In the case where a polygon is N polygon (where N is 4 or more), the N polygon is divided into (N−2) triangles, and processing is carried out for such each triangle.

The vertex coordinate of each vertex relates to a triangle or polygonal shape in which coordinate conversion and illumination processing are carried out by means of the CPU 91 and the coordinate conversion and illumination calculator 93, the triangle or polygonal shape being projected on the screen coordinate system.

Figure 7:
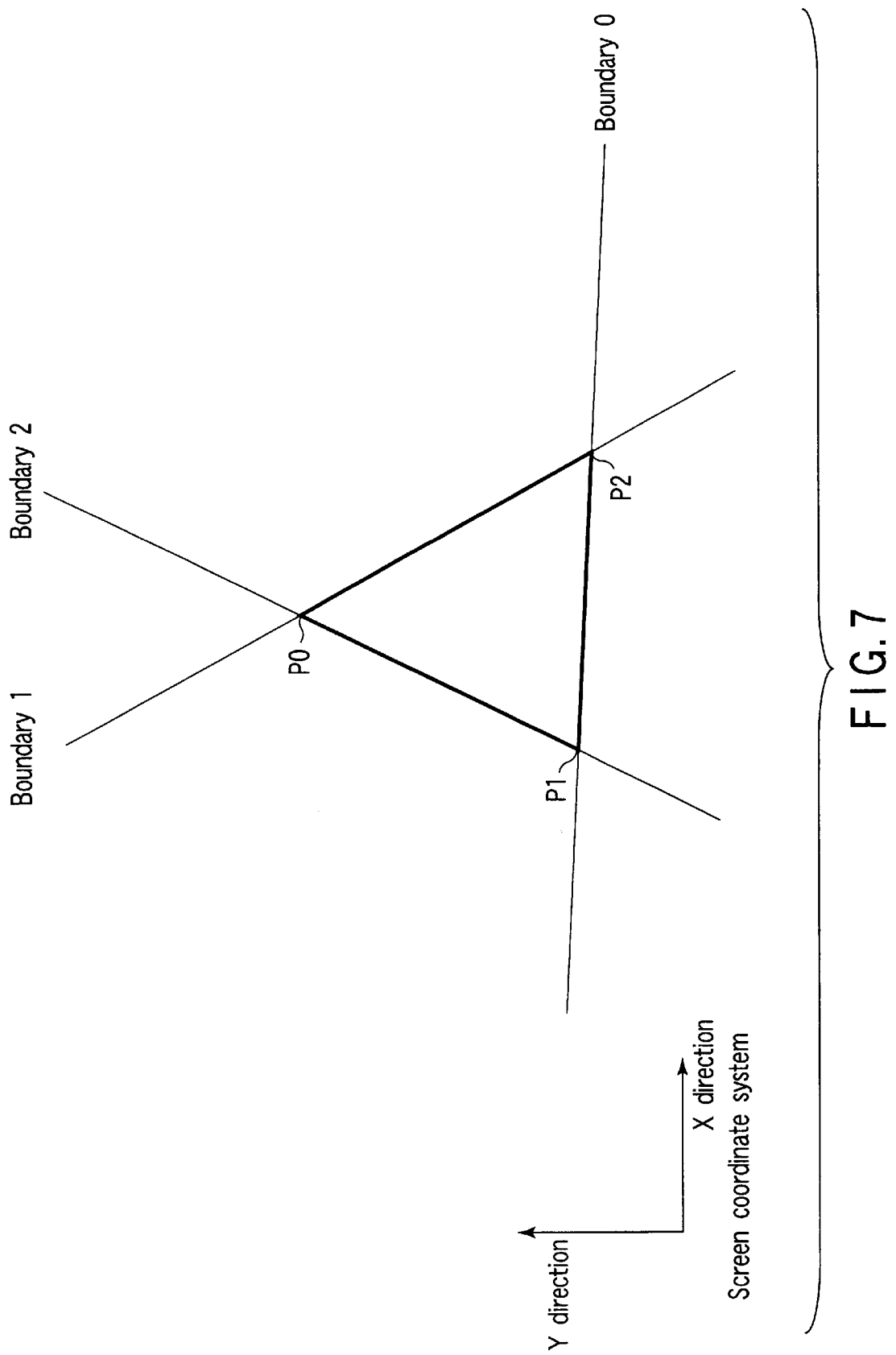
FIG. 7 is a view showing an example of a stationary triangle in the same embodiment.

As shown in FIG. 7 one stationary triangle has three vertexes (P0, P1, P2). The vertex information on each vertex consists of an (X, Y) coordinate value in the two-dimensional screen coordinate system that corresponds to a coordinate system on the vertex display screen and a variety of attributes values of such vertexes. A variety of attribute values include, for example, the Z coordinate values or W coordinate values in depth direction, FOG values that indicate the density of fog, color values that represents colors (for example, values R, G, B, and A), texture coordinate values (S, T, Q) or the like.

Figure 8:
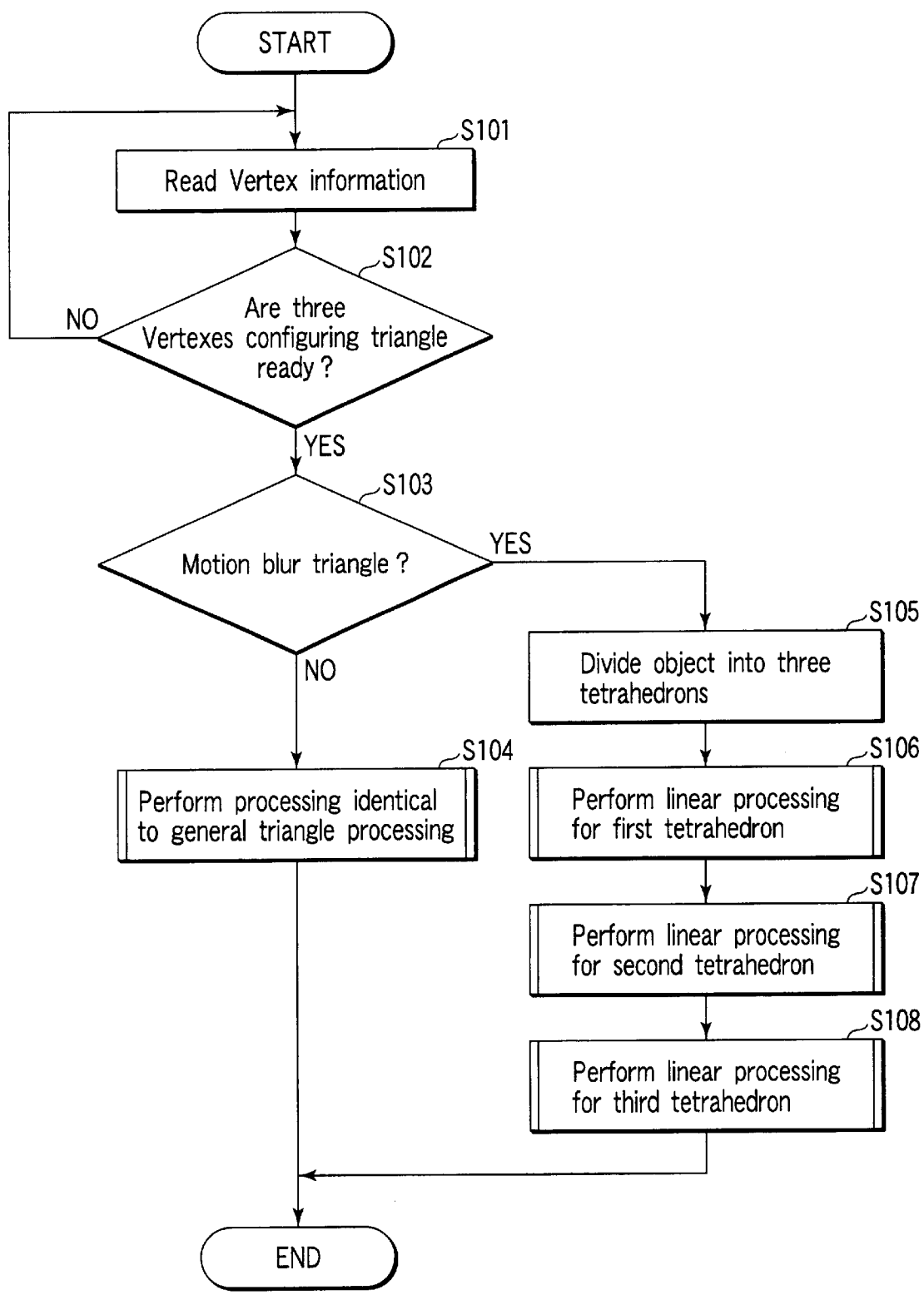
FIG. 8 is a flow chart showing an example of processing procedures at a vertex data input device of a rendering apparatus according to the same embodiment.

FIG. 8 shows an exemplary flow of processing of an vertex data input device of the rendering device 1. Processing at the steps S106 to 108 can be carried out properly in parallel according to a configuration of the rendering device 1, as described previously.

The vertex data input device 10 processes a polygon by dissembling it into a plurality of triangles. Thus, this device waits until three vertexes configuring one triangle have been set (step S102), and reads vertex information on each vertex (step S101).

When three vertexes configuring one triangle are set (step S102), it is determined whether or not a given triangle is to be motion blurred (step S103). If no motion blur is carried out, processing for rendering a stationary triangle is carried out as usual (step S104).

In the case where it is determined that motion blur is carried out, there is provided vertex information at two points of time relevant to the three vertexes of that triangle, that is, information on six vertexes.

Figure 9:
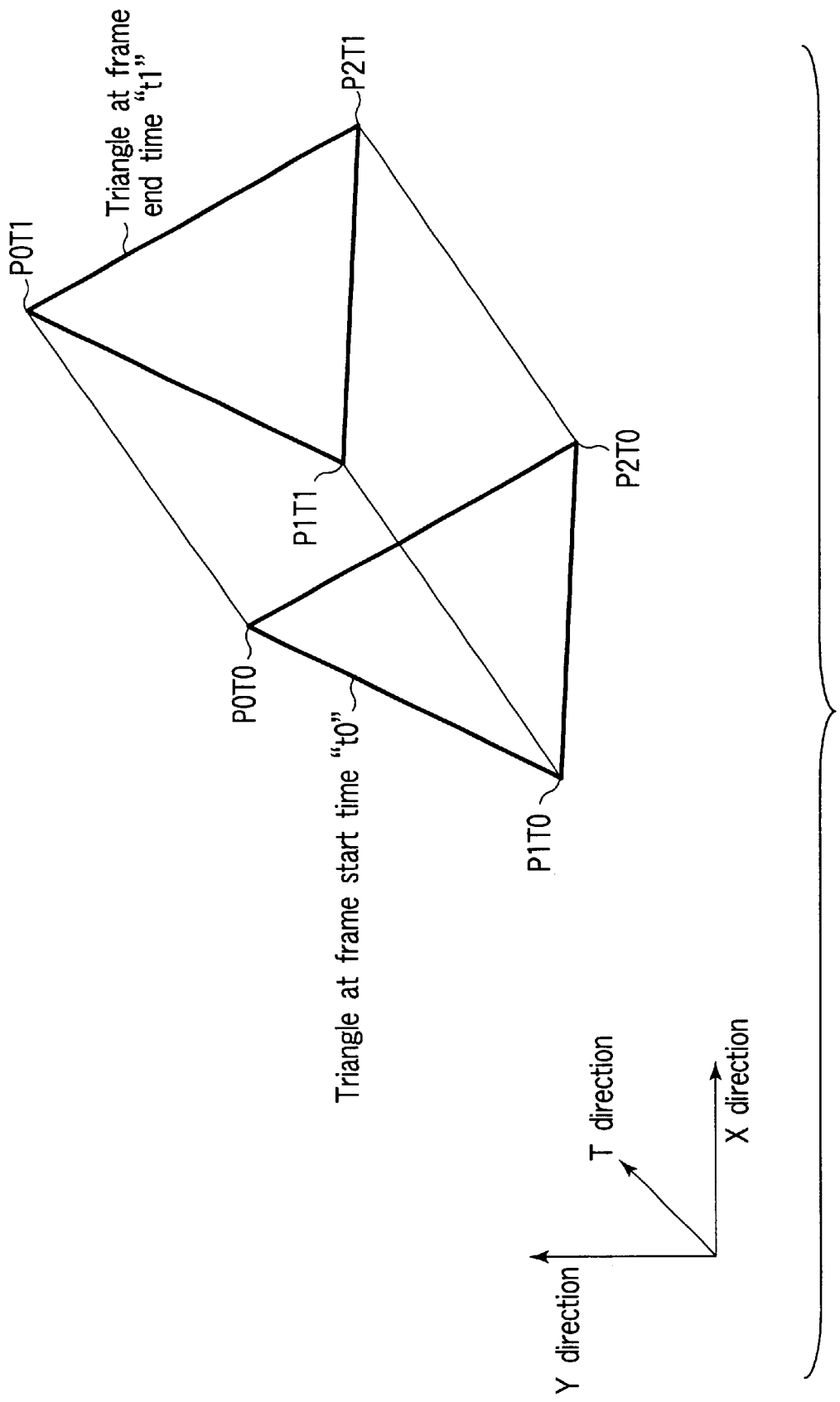
FIG. 9 is a view showing an example of a triangular prism structure composed of motion blur triangles in the same embodiment.

As shown in FIG. 9 these six vertexes (P0T0, P1T0, P2T0) and (P0T1, P1T1, P2T1) can be regarded as a triangular prism in a three-dimensional space in which a time axis T is introduced into the two-dimensional screen coordinate system.

The vertex data input device 10 divides this triangular prism into a tetrahedron structure in which linear processing is easy (step S105).

Figure 10:
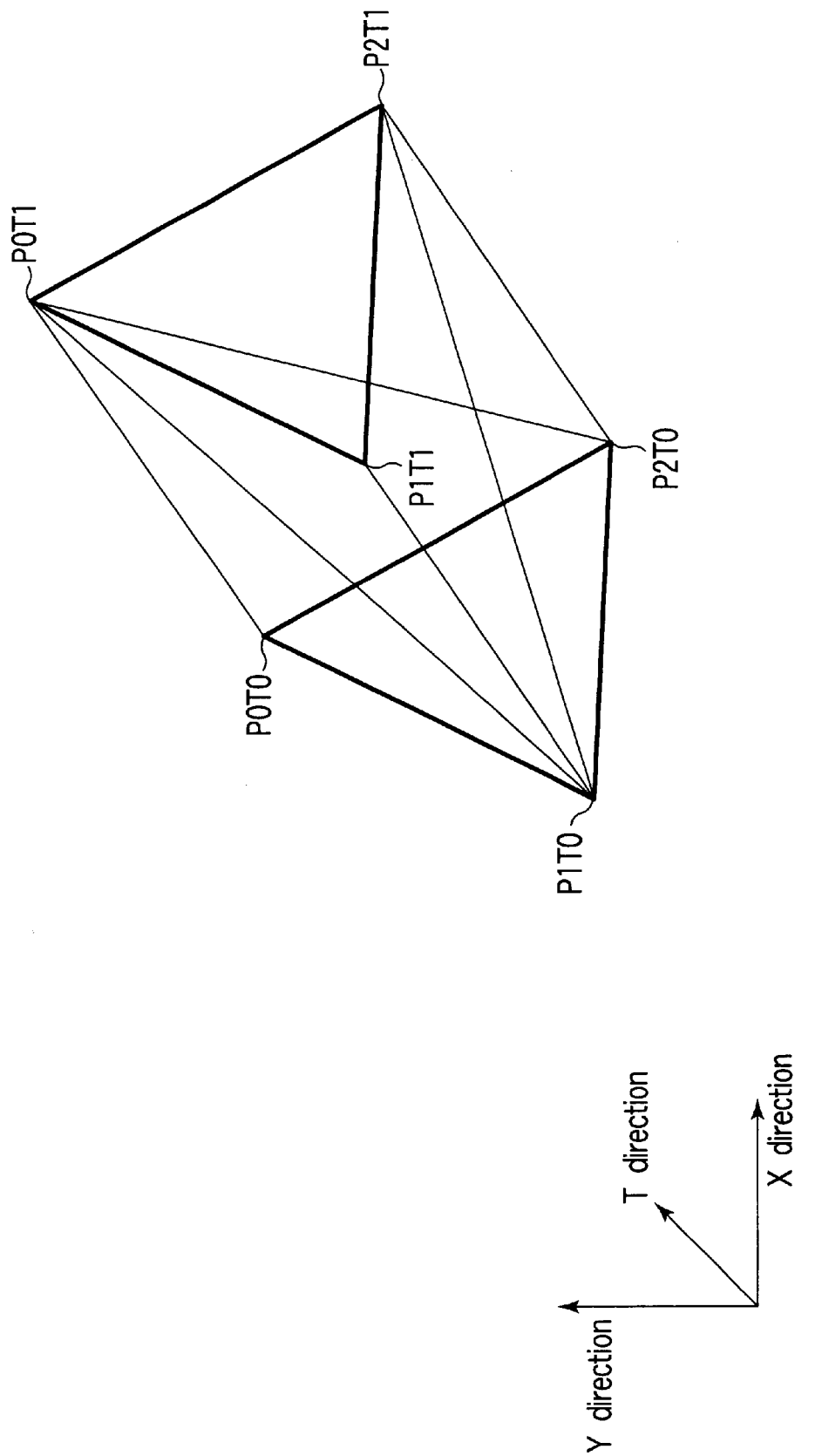
FIG. 10 is a view showing an example of cutting lines when a motion blur triangle in the same embodiment is divided into three tetrahedrons.
Figure 11:
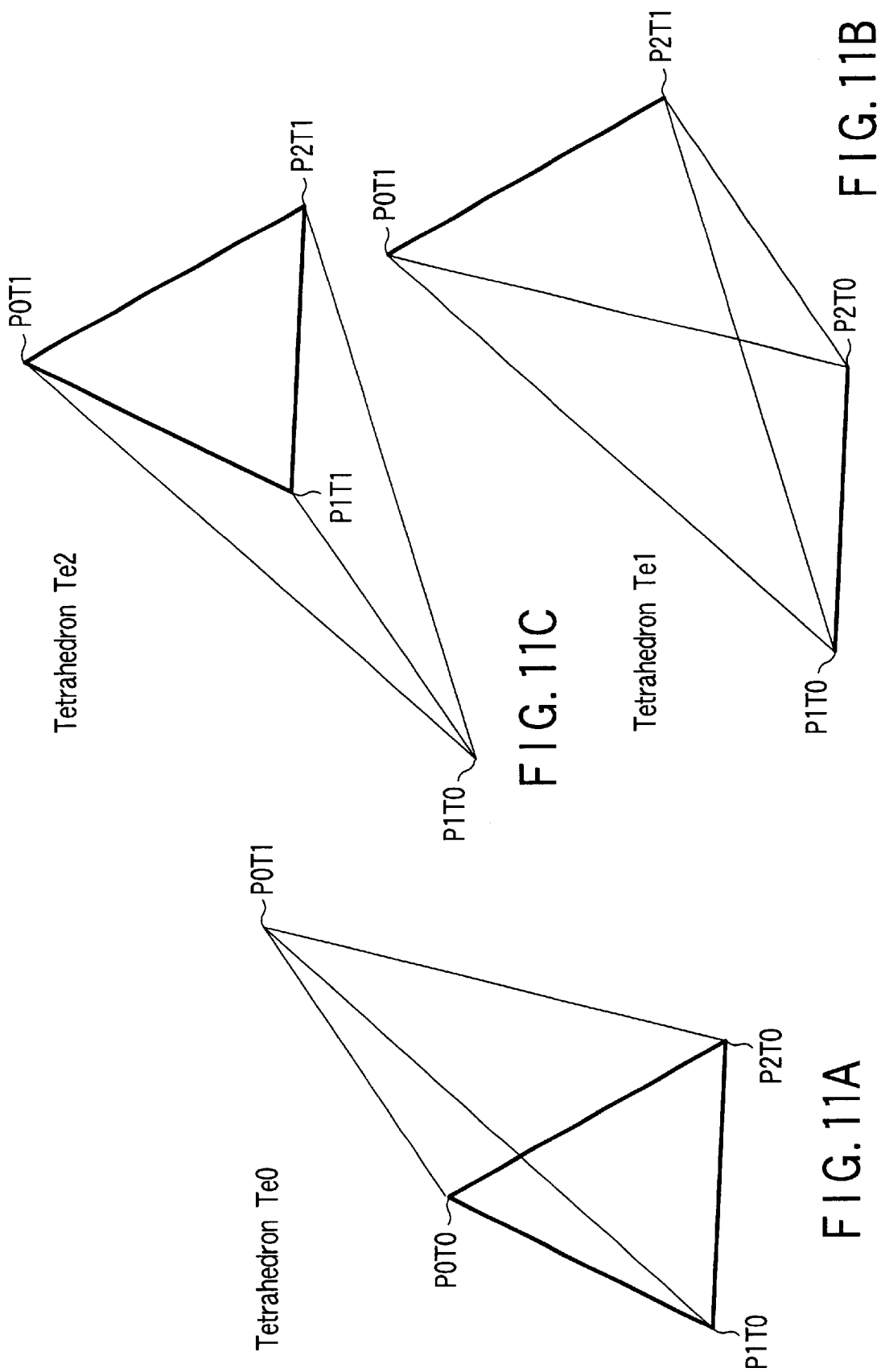
FIGS. 11A, 11B and 11C are views showing three tetrahedrons obtained by dividing a motion blur triangle into three.

The tetrahedron shown in FIG. 9 can be divided into three tetrahedrons Te0, Te1, and Te2, as shown in FIG. 11A, FIG. 11B, and FIG. 11C, by introducing a cutting line as shown in FIG. 10, where tetrahedron Te0=(P0T0, P1T0, P2T0, P0T1);

tetrahedron Te1=(P1T0, P2T0, P0T1, P2T1); and tetrahedron Te2=(P1T0, P0T1, P1T1, P2T1).

The vertex data input device 10 sequentially sends three tetrahedrons to the linear processor 20 in a configuration in which one linear processor 20 is provided as shown in FIG. 2 (steps S106 to S108).

As shown in FIG. 3, in a configuration in which three linear processors 20 are provided, the input device sends three tetrahedrons simultaneously sends three tetrahedrons, for example, according to a processing schedule (steps S106 to S108).

In addition, in the case of the other exemplary configurations as well, the input device sequentially or simultaneously sends three tetrahedrons to the linear processor 20 according to the number of linear processors 20 or the processing schedule as described previously (steps S106 to S108). The linear processor 20 carries out a rendering process using linear processing for a given tetrahedron.

Here, processing when no motion blur is carried out will be described prior to describing processing when a motion blur is carried out.

In rendering a stationary triangle projected on the screen coordinate, a pixel contained in that triangle is rendered, thus making it necessary to determine whether a predetermined pixel (x, y) is contained in that triangle. This determination can be performed by means of result codes after a pixel (x, y) has been substituted for two linear equations in which three sides configuring the triangle are defined as boundaries, respectively. In FIG. 7, for example, these three linear equations are:

an equation expressing boundary 2 that passes through vertex P0, P1;

an equation expressing boundary 0 that passes through vertex P1, P2; and an equation expressing boundary 1 that passes through vertex P2, P0.

Which side a pixel (x, y) to be searched exists on at each boundary is obtained in a linear form, whereby it is determined whether or not the pixel (x, y) is inside of the triangle.

The attribute values such as color of the pixel (x, y) inside the triangle is obtained by performing linear interpolation of the attribute values of three vertexes that configures that triangle.

Any of these values can be obtained by the following linear formula relevant to "x" and "y".

$$D(x, y) = D0 + dD/dx \cdot x + dD/dy \cdot y$$

The linear interpolation coefficients of this linear formula are defined as follows. That is, D0 denotes an initial value at an origin; dD/dx denotes an increment coefficient in an X direction or a gradient value; and dD/dy denotes an increment coefficient in a Y direction or a gradient value.

Each linear interpolation coefficient can be obtained by solving simultaneous linear equations of three equations obtained by substituting the coordinate values (x, y) relevant to three vertexes (P0, P1, P2) and its attribute value D (x, y) for the above equation.

In this way, a triangle in which no motion blur is carried out is rendered while linear interpolation is carried out by DDA (Digital Differential Analysis) after a linear interpolation coefficient has been obtained.

In a triangle in which motion blur is carried out, a linear equation is established relevant to a three-dimensional space in which a time axis is introduced as an extension of the above formula, that is, relevant to the inside of a space (X, Y, T) in which a time axis is introduced into the screen coordinate axis.

It is determined whether or not a sampling point (x, y, t) is to be rendering on a pixel (x, y) according to whether or not that sampling point (x, y, t) is inside a tetrahedron.

In an example described later, a sampling time "t" relevant to the pixel is determined depending on the coordinate value (x, y) of each pixel on the screen coordinate. Thus, it is determined whether or not each pixel (x, y) is rendered relevant to the sampling time "t" according to whether or not the sampling point (x, y, t) is inside of the tetrahedron. In addition, in this case, the sampling point (x, y, t) relevant to one sampling time "t" belongs to the inside of any one of the three tetrahedrons or does not belong to any of these tetrahedrons. In the former case, a tetrahedron is rendered after processed by the linear processor 20 responsible for the tetrahedron. In the latter case, the pixel is not rendered for the triangle. In addition, with respect to each pixel (x, y), there can be employed a method using only one sampling point and a method using two or more sampling points which is the same as the number of pixels. In the case where the attribute values are obtained according to a plurality of sampling points relevant to one pixel, these values are written into an image memory, and then, processing such as averaging or filtering is applied.

It is determined by result codes whether or not the sampling point (x, y, t) is inside of a tetrahedron by substituting the sampling point (x, y, t) for four linear equations in which four faces configuring the tetrahedron are defined as boundaries, respectively.

Figure 12:
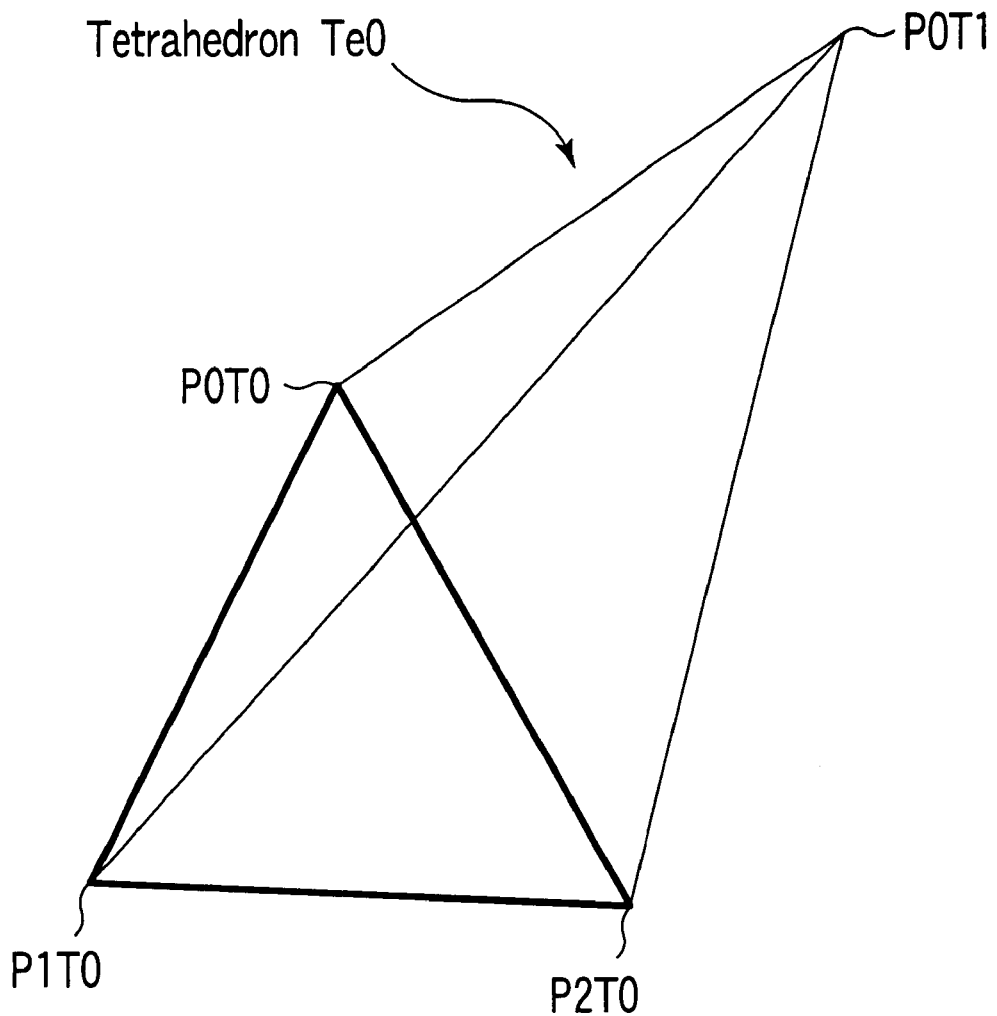
FIG. 12 is a view showing an example of one tetrahedron structure in the same embodiment.

In the triangle shown in FIG. 12, for example, these four linear equations are:

an equation in which a face passing through vertexes P0T0, P1T0, P2T0 is expressed as a boundary;

an equation in which a face passing through vertexes P0T0, P1T0, P0T1 is expressed as a boundary;

an equation in which a face passing through vertexes P0T0, P1T0, P0T1 is expressed as a boundary; and an equation in which a face passing through vertexes P2T0, P0T0, P0T1 is expressed as a boundary.

The attribute value D such as color at a point (x, y, t) inside the tetrahedron, i.e., the attribute D relevant to the sampling time "t" in pixel (x, y) is obtained by linearly interpolating the attribute values of four vertexes that configure the tetrahedron. That is, in the present embodiment, instead of performing linear interpolation by using attribute values for six vertexes of the triangular prism in order to obtain the attribute value D, four vertexes configuring a tetrahedron to which a point (x, y, t) belongs are employed, thereby simplifying an amount of processing and facilitating packaging.

As is the case with a stationary triangle, any of these vertexes are expressed by the following linear equation relevant to "x", "y", and "t".

$$D(x, y, t) = D0 + dD/dx \cdot x + dD/dy \cdot y + dD/dt \cdot t$$

The linear interpolation coefficients of this linear format are as follows. That is, D0 denotes an initial value at an origin; dD/dx denotes an increment coefficient in an X direction or a gradient value; dD/dy denotes an increment coefficient in a Y direction or a gradient value; and dD/dt denotes an increment coefficient in a direction of a time axis "t" or a gradient value.

The linear interpolation coefficient is obtained by solving the simultaneous linear equations obtained by substituting the coordinate value (x, y) relevant to four vertexes and their attribute values D (x, y, t) for the above equation.

Figure 13:
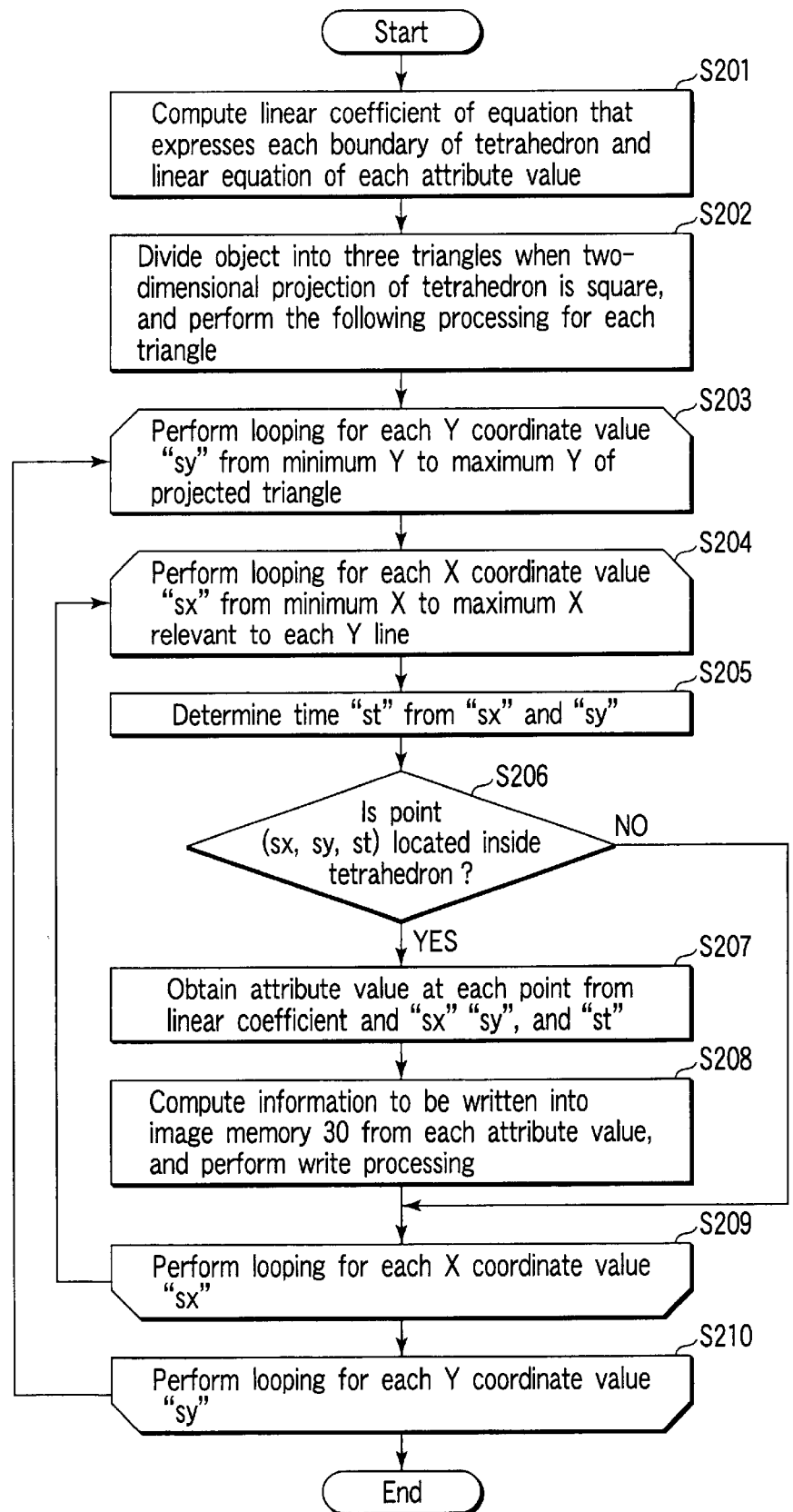
FIG. 13 is a flow chart showing an example of processing procedures at a linear processor of the rendering apparatus according to the same embodiment.

FIG. 13 shows an example of flow of processing in a linear processing of the rendering device 1. Processes for respective tetrahedrons are independent of each other (therefore, in the case of a configuration in which a plurality of linear processors 20 is provided, parallel processing is made possible).

At the linear processor 20, as described previously, the linear interpolation coefficients are first obtained with respect to the formula that represents each boundary and the linear format of each attribute value (step S201).

Next, a filling process in units of pixels is carried out for a stationary triangle or a motion blur triangle relevant to the image memory 30 (or 32).

In the meantime, an attribute value is also determined by sampling one point in pixels relevant to one pixel, whereby a motion blur can be computed (however, a course image may be produced). In general, in order to compute an image with its higher resolution, sampling is carried out for one pixel at a plurality of sampling points (sx, sy) in such one pixel. Then, the attribute values such as color information at the respective sampling points obtained as the result of such sampling are written into an image memory, and then, an averaging or filtering process is applied to the written attribute values, whereby the averaged or filtered values may be defined as pixel attribute values. In this case, although information in units of sub-pixels which is more detailed than pixel units is recorded in the image memory, its storage method is not particularly limited. In addition, no particular limitation applies to a method for defining a sampling point (sy, sy) in one pixel as well, and a variety of sampling methods are available.

It is possible to employ a plurality of sampling positions relevant to the inside of a pixel and to further employ a plurality of time based sampling points relevant to all or part of the sampling positions in the pixel. In this case, all the obtained attribute values may be subjected to averaging or filtering process.

Now, an example of dividing a pixel into two-dimensional meshes and sampling a plurality of points in the pixel will be described here.

Figure 14:
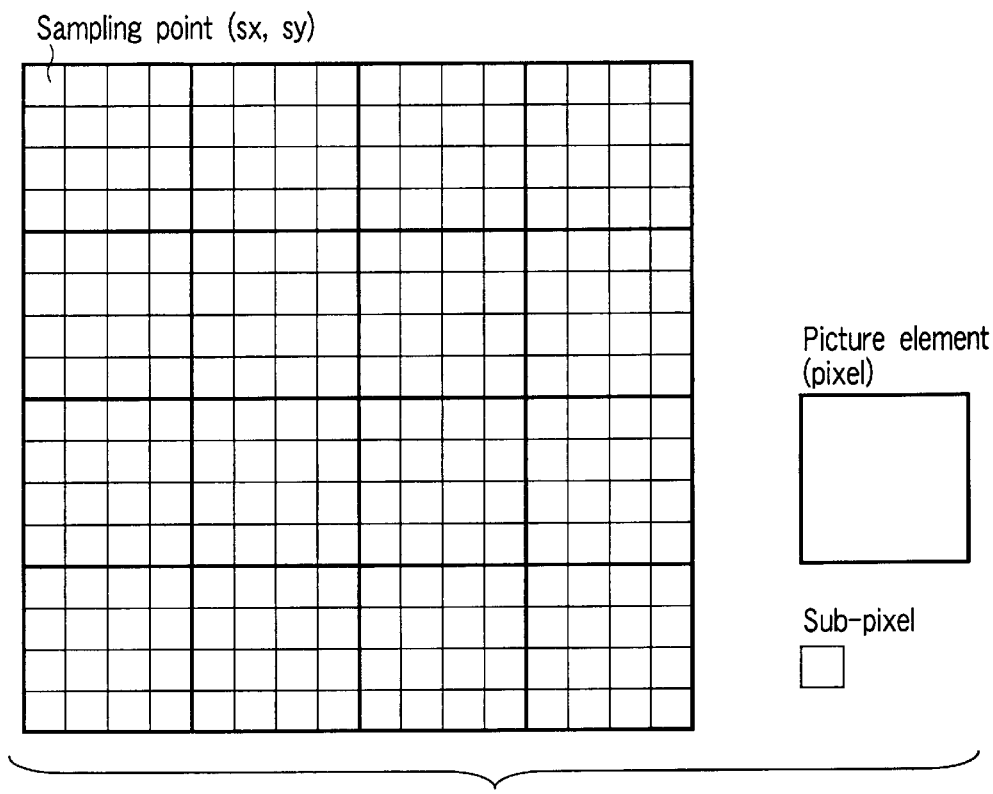
FIG. 14 is a view showing an example of pixels and sub-pixels each configured of an image memory in the same embodiment.

FIG. 14 shows an example of an image memory 30 when one pixel is divided into 4×4 sub-pixels, and these sub-pixels are defined as sampling points.

Figure 15:
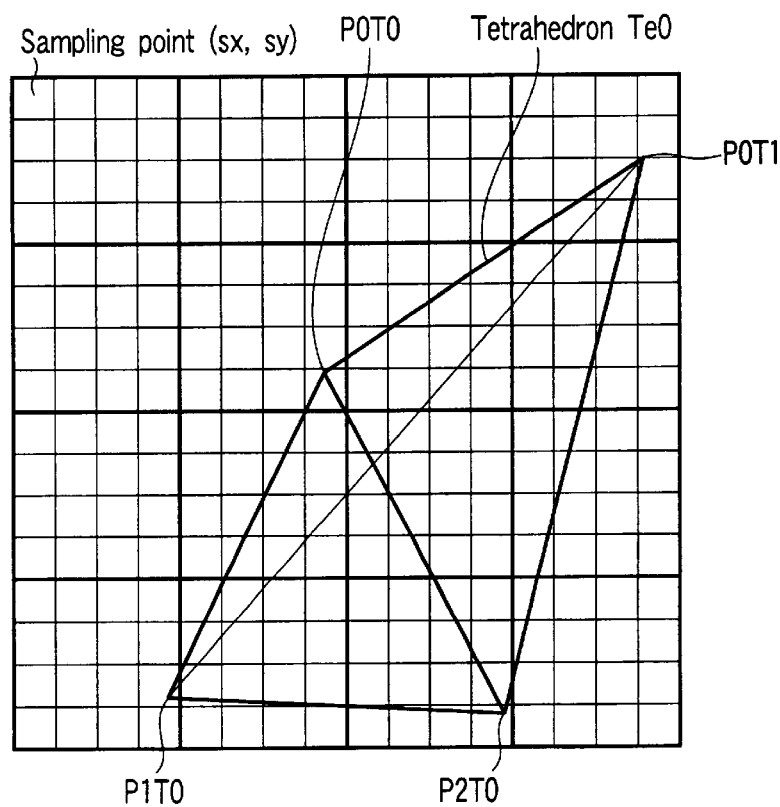
FIG. 15 is a view showing an example of one tetrahedron projected onto the image memory in the same embodiment.

FIG. 15 shows how a tetrahedron is projected on the image memory 30 shown in FIG. 14. Hereinafter, a flow of rendering a tetrahedron Te0 shown in FIG. 12 by sampling it will be described by way of example.

Although a description is given here by way of an example of technique in which a DDA clustering is extended, of course, it is possible to employ the other method, for example, a direct evaluation technique for substituting (sx, sy, st) for the equation for each sampling, thereby obtaining a value.

With respect to the tetrahedron Te0A, a range targeted for the filling process in units of pixels are an area in which four points configuring Te0 are projected on an XY plane.

As shown in FIG. 15, in the case where a square is obtained, such square is divided into two triangle area, that is, Area 1=(P0T0, P1T0, P2T0) and Area 2=(P0P0, P2T0, P0T1).

Then, the following processing is carried out for a respective one of these areas (step S202).

A filling process in units of pixels are defined as a repetitive process while an area covered with a triangle is determined and while advancement in units of sub-sampling in the X and Y directions is obtained (steps S203 and S204).

A sampling time "st" is obtained with respect to each sampling point (sx, sy) (step S205). This sampling time "st" is determined by means F { } by using sx, sy;

$$st = F\{sx, sy\}$$

where F { } denotes means for which a time between two points of time at which "st" is given, and "st" is defined in a distribution these times are different from each other at the adjacent sampling points. Here, as an example, when an image of a predetermined time "ti" is produced, it is assumed that vertex information at the time "t" and vertex information at time "ti−1" before the single frame time are employed. Thus, "st" is within the range of ti−1 to ti.

The sampling times "st" are not identical to each other at each sampling point (which is equivalent to an effect of differentiating a strobe timing), whereby a motion blur image can be computed. If the sampling times "st" are identical to each other relevant to all the "sx" and "sy" values, a stationary triangle rendered at a position that corresponds to "st" is obtained (when st=ti, an original image at the time "ti" is obtained)

Packaging of means F { } is uniquely determined relevant to a sampling point (sx, sy). For example, this packaging is achieved by a computing circuit, a two-dimensional array, or a one-dimensional array (the packaging can be achieved by hardware and software).

Here, some examples of F { } are shown.

(1) A method using a function when "sx" and "sy" are defined as inputs $$st = fncA(sx, sy)$$

(2) A method of subtracting a table for two-dimensional array from "sx" and "sy"

$$st = array\,[sx][sy]$$

(3) A method of subtracting a table for two-dimensional array after "sx" and "sy" have been converted by a function $$st = array\,[fncA(sx)][fncB(sy)]$$

(4) A method of defining a value by a function when "sx" and "sy" are defined as inputs, and subtracting a table for one-dimensional array using the value $$st = array\,[fncA(sx, sy)]$$

(5) Other variations $$st = fncA\,(array\,[sx], array\,[sy])$$

$$st = fncA\,(array\,[sx][sy])$$

Apart from the above, a variety of modes are available.

In addition, there can be provided a configuration in which all pixel regions of a screen are covered with one F { } and a configuration in which a partial region of vertical 1/n and horizontal m/1 of the screen is covered with one F { }, and the F { } is applied to "n×m" partial regions similarly. Further, in the latter case, the F { } values in which a plurality of contents are different from each other are provided, making it possible to selectively use them for each partial region. This makes it possible to differentiate the pixel coverage of a plurality of F { }.

As described previously, a plurality of points of time are defined from a pair of "sx" and "sy", and the following processing is performed for a respective one of these points of time, thereby making it possible to achieve a higher quality image.

Here, as an example, a description will be given, assuming that one st=f (sx, sy) is defined relevant to a pair of "sx" and "sy".

In the meantime, a distribution of sampling time "st" is changed relevant to a sampling point (sx, sy), whereby impression of a produced image can be changed. In the case where a function is used for F { }, means for externally inputting a value for a function coefficient is provided, whereby the user can change a distribution of sampling times, and can change an image quality. In the case where a two-dimensional or one-dimensional array table is used for F { }, means for externally inputting a table value is provided, whereby the user can specify a distribution of arbitrary sampling times, and can change an image quality.

Now, a relationship among a sampling point (sx, sy), a sampling time "st", and an attribute value D will be described here with reference to FIG. 16A and FIG. 16B.

FIG. 16A shows a triangular prism targeted to be processed in an (X, Y, T) space, the triangular prism being projected on an X-T plane. FIG. 16B shows a triangular prism targeted to be processed in an (X, Y, T) space, the triangular prism being projected on an X-Y plane. These figures each show an example when a triangle positioned at the left side of the screen in "ti−1" is moved at the right side of the screen in "ti" (this triangle is moved in parallel in an X-axis direction for clarity). The tip end of each arrow indicated by alternate dot and chain line shown in FIG. 16A represents the corresponding X-coordinate value shown in FIG. 16A, the value being indicated by the alternate dot and chain line sampling time "st" relevant to a pixel or sub-pixel having a Y coordinate value (of a triangular prism) of Y=yj shown in FIG. 16B.

In FIG. 16A, in the case where the tip end of the arrow indicated by alternate dot and chain line exists inside a triangular prism (inside any of the three tetrahedrons), the attribute value is computed with respect to such pixel or sub-pixel. That is, linear interpolation of the attribute value is carried out by means of a linear processor responsible for a tetrahedron to which the sampling point (sx, sy, st) belongs, based on information concerning four vertexes of the tetrahedron. On the other hand, in the case where the tip end of the arrow indicated by alternate dot and chain line does not exist inside of the hexagonal prism (inside any of the three tetrahedrons), linear interpolation of the attribute value is not carried out for such pixel or sub-pixel.

Figure 17A:
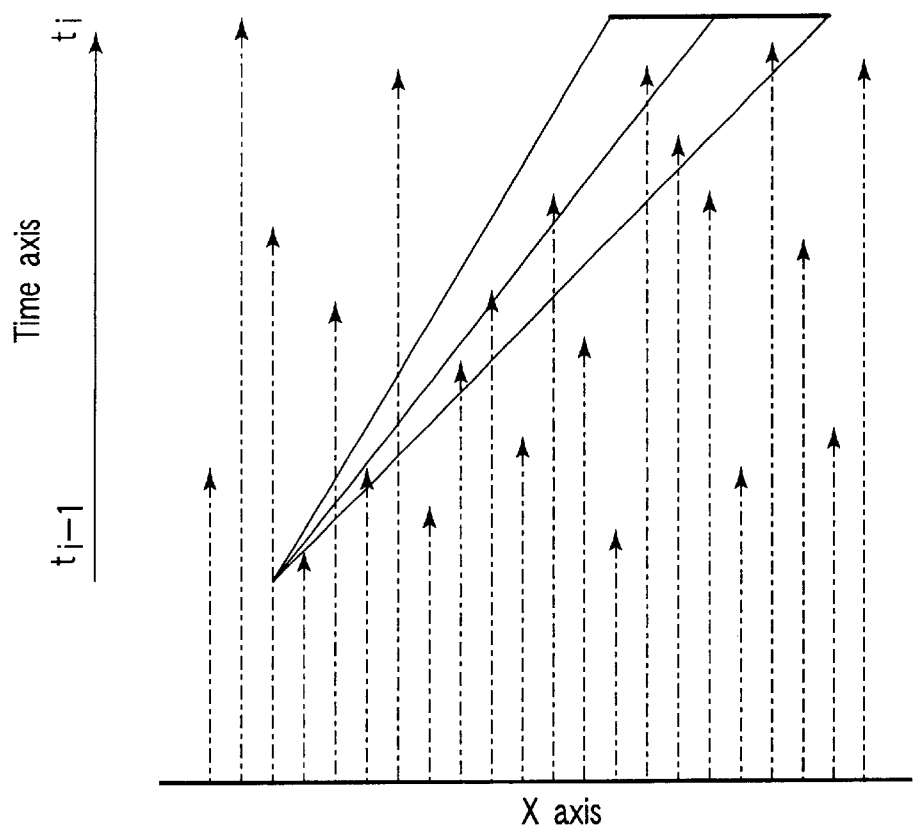
FIGS. 17A and 17B are views each illustrating sampling in the rendering apparatus according to the same embodiment.
Figure 17B:
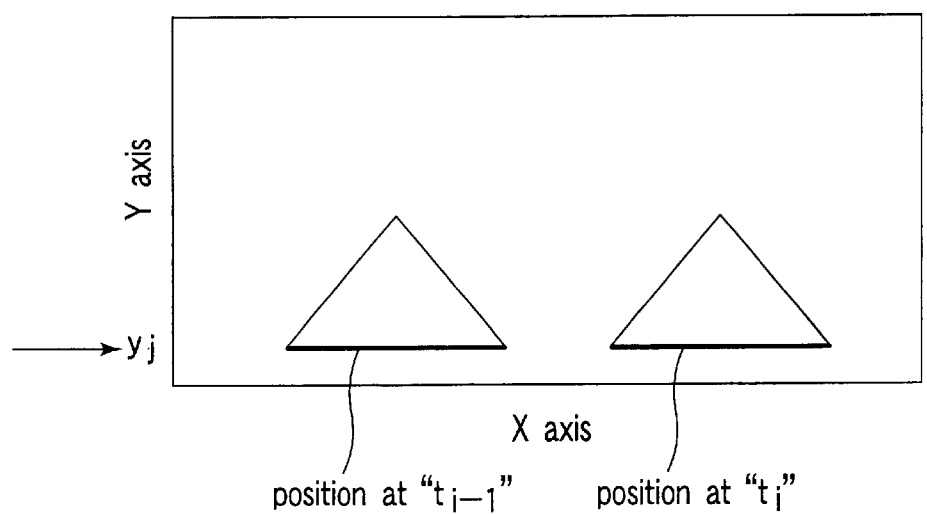

FIG. 17B shows a portion of one tetrahedron that configures a triangular prism shown in FIG. 17B in the same manner as FIG. 16B.

A distribution of sampling times "st" (tip end position of the arrow indicated by alternate dot and chain line shown in FIG. 16A) relevant to each sampling point (sx, sy), whereby a motion blur image quality can be changed.

Examples of motion blur image qualities are shown below.

(1) Sampling times "st" are uniformly distributed, whereby an afterimage remains strongly as a whole, and a dynamic image is produced.

(2) More intermediate points of frame times (for example, (ti−1, +ti)/2) are distributed as "st", whereby a dynamic image is produced while the details of an object are visualized.

(3) A distribution in the second half of frame time that is "st" is increased, whereby an image is produced such that the movement of an object is seen as persistence.

(4) All the sampling times "st" are set to the same times, whereby a motion blur effect can be stopped.

Apart from the above, a variety of motion blur contents are available.

Figure 18A:
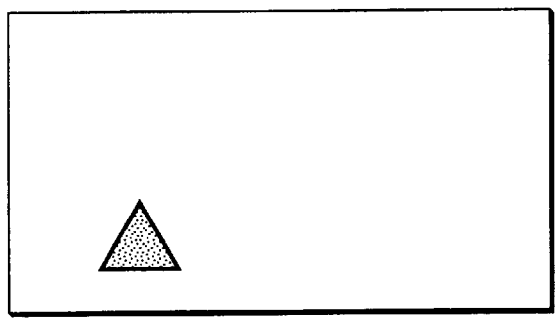
FIGS. 18A, 18B, 18C, 18D, and 18E are views each illustrating type of motion blur in the rendering apparatus according to the embodiment.
Figure 18B:
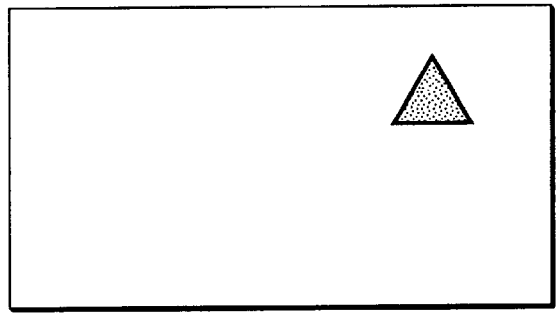
Figure 18C:
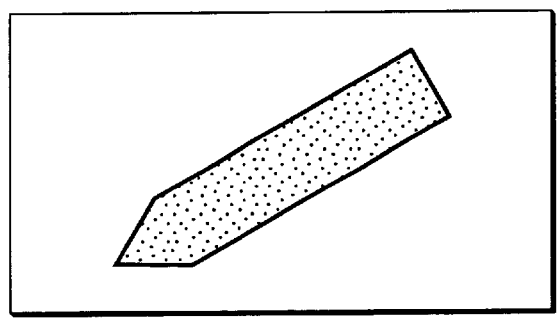
Figure 18D:
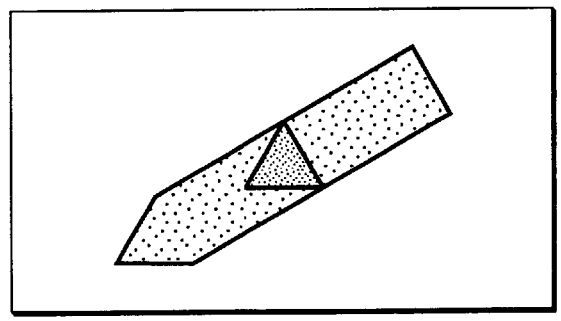
Figure 18E:
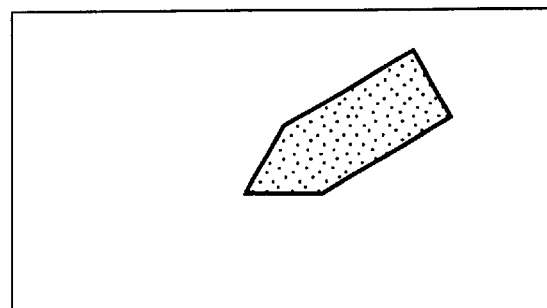

For example, assuming that a triangle is position at the lower left of the screen at "ti−1", as shown in FIG. 18A, and that the triangle is moved to the upper right of the screen at "ti", as shown in FIG. 18B, there are shown a view illustrating an example of the above (1) in FIG. 18C; a view illustrating an example of the above (2) in FIG. 18D; and a view illustrating an example of the above (3) in FIG. 18E.

In this case, instead of indicating whether or not a motion blur is present, it is possible to indicate all the sampling times "st" as "ti" with respect to a polygon in which no motion blur is carried out.

Next, a formula representing four boundaries is employed to test whether or not a sampling point (sx, sy, st) is included in any of the three tetrahedrons produced by dividing a targeted original triangular prism) (step S206).

If it is determined that the sampling point (sx, sy, st) is not included in the tetrahedron, the subsequent computation of the attribute values and writing into image memory are skipped.

In the case where it is determined that the sampling point (sx, sy, st) is included in the tetrahedron, the attribute value is obtained with respect to each sampling point (sx, sy, st) (step S207).

A formula for obtaining the attribute value D is given below.

$$D(sx, sy, st) = D0 + dD/dx \cdot sx + dD/dy \cdot sy + dD/dt \cdot st$$

When a DDA is used, the term concerning the X direction and Y direction is obtained by the DDA increment. For example, in the case where scanning is performed in the X-direction, the previously computed value at the adjacent points in the X direction is used, and the increment in the X-direction is added thereto, whereby D can be obtained with a small amount of computation.

$$D(sx, sy, sz) = (D0 + dD/dx \cdot sx + dD/dy \cdot sy) + dD/dt \cdot st = D(sx-1, sy, st) + dD/dx + dD/dt \cdot st$$

In addition, with respect to the term in the time axis direction, the sampling times "st" obtained by F { } are discretely handled, whereby the table value "dt_table" corresponding to each "dt" is obtained prior to performing a filling process in units of pixels, and the obtained value is utilized, whereby D can be obtained with a small amount of computation.

$$D(sx, sy, st) = (D0 + dD/dx \cdot sx + dD/dy \cdot sy) + dD/dt \cdot st = (D0 + dD/dx \cdot sx + dD/dy \cdot sy) + dt\_table\ [st]$$

When the above value is combined with DDA, the following equation is obtained $$D(sx, sy, st) = D(sx-1, sy, st) + dD/dx + d\_table\ [st]$$

where the attribute value can be computed without using multiplication.

From each of the thus obtained attribute values, as in a general method, texture mapping is carried out as required, and sub-pixel information to be written into a sampling point (sx, sy) on a screen is determined. Then, hidden screen erasure or α-blending is carried out by using information contained in an image memory as required, and pixel information is written into the image memory as required (step S208).

The above processing is repeatedly carried out in units of pixels in the X direction and Y direction with respect to an area covered with a triangle, and rendering of the triangle is terminated (steps S209 and S210).

In this manner, in the case where one triangle portion having a tetrahedron projected therefrom has been rendered, and the projected tetrahedron is produced as a square, similar processing is carried out for another triangle portion, whereby rendering of one tetrahedron terminates.

This rendering is carried out for three tetrahedrons, whereby rendering of one motion blur triangle has completed.

As has been described above, according to the present embodiment, three-dimensional model data on two points of time is computed, and the computed data is sent to the rendering apparatus, thereby making it possible to rendering a high resolution motion blur image with a small amount of computation as compared with a conventional multi-path rendering. Depending on type of video image, even if the number of frames per second is reduced for rendering an image, there can be provided a dynamic image caused by an afterimage affect.

Each of the above functions can be implemented as software.

According to the embodiment of the present invention, there can be provided a computer readable recording medium having recorded therein a program that causes a computer to execute predetermined devices (or causes the computer to function as predetermined devices or causes the computer to achieve a predetermined function).

Preferably, in each of the linear processes relevant to the tetrahedron, one or more sampling times on the time axis of the three-dimensional space is obtained for each pixel on the two-dimensional image. It is determined whether or not rendering information is to be obtained according to whether or not the sampling points in the three-dimensional space defined by the obtained sampling time exists inside of the tetrahedron, and the attribute information on four vertexes configuring the tetrahedron is subjected to linear interpolation processing in the three-dimensional space relevant to the pixel determined to be obtained and its sampling time, whereby rendering information for a motion blur image may be obtained.

Preferably, the linear processing means may comprise a second for obtaining the sampling time by using array data or a function, and a section for making it possible to externally write the contents of the array data or function coefficient data and/or making it possible to externally specify which of plural types of the array data or function is employed. In this manner, a desired motion blur image quality can be achieved.

In addition, preferably, in the linear processing means, when rendering information on each pixel is obtained by the linear interpolation processing, with respect to terms in the pixel coordinate axis direction of a two-dimensional image, another pixel value may be obtained using a difference based on a pixel on which a value has been already obtained, and/or, with respect to terms in the time axis direction, a value may be obtained by using a predetermined value table. In this manner, a computation amount can be reduced (multiplication can be omitted).

Further, preferably, linear processing means may be provided in plurality so as to execute processing for a plurality of tetrahedrons in parallel.

Furthermore, preferably, in the case where information on an N polygon (N is 4 or more) is provided as a polygon of an object targeted to be rendered, the N polygon is divided into (N−2) triangles, and division into the three tetrahedron may be carried out with the thus obtained triangle being a processing unit.

The present invention relating to the apparatus can be provided as the invention relating to the method, and vice versa.

According to the present invention, linear processing based on vertex information on two points of time relevant to a triangle that configures an object projected on the screen coordinate is carried out so as to obtain image rendering information, thus making it possible to render a high resolution motion blur image with a small amount of computation.

In addition, according to the present invention, unlike a conventional triangle rendering apparatus, in order to smoothly rendering a change between two points of time from vertexes in these two points of time, a triangular prism structure composed of triangle vertex information on the two points of time is divided into three tetrahedrons, and linear processing is carried out for the respective tetrahedrons, whereby an afterimage effect can be rendered at a high speed.

Further, linear processing for three tetrahedron is carried out in parallel, an afterimage effect can be rendered at a higher speed.

Furthermore, although only a triangular coordinate can be interpolated in a conventional filter type motion blur technique, a time based change in another attribute information can also be interpolated according to the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A motion blur image rendering method for a three-dimensional computer graphics, the method comprising:

generating first information concerning three vertexes in a two-dimensional triangle image as an object at two points of time to obtain second information concerning six vertexes;

dividing into three tetrahedrons a triangular prism formed by the six vertexes in a three-dimensional space defined by a pixel coordinate axis of the two-dimensional triangle image and a time axis; and subjecting each of the three tetrahedrons to linear processing to obtain rendering information for a motion blur image.

2. A motion blur image rendering method for a three-dimensional computer graphics comprising:

generating two-dimensional coordinate values of three vertexes of a two-dimensional triangle as an object at two points of time to acquire information concerning six vertexes and attribute information on each of the vertexes, the triangle being extracted from a projection image formed when a three-dimensional model is projected onto a two-dimensional plane;

dividing into three tetrahedrons a triangular prism formed by the six vertexes in a three-dimensional space defined by pixel coordinate axes of the two-dimensional triangle and a time axis; and subjecting each of the tetrahedrons to linear processing in the three-dimensional space using four vertexes extracted from among the six vertexes, the three-dimensional space being based on the two-dimensional coordinate values, the attribute information and the two points of time, to obtain rendering information for a motion blur image.

3. A method as claimed in claim 2, comprising:

obtaining one or more sampling points of time on the time axis in the three-dimensional space for each pixel on the two-dimensional image during the linear processing for each of the three tetrahedrons;

determining whether or not the rendering information should be obtained depending on whether or not sampling points in the three-dimensional space defined by the sampling points of time exist inside of the tetrahedrons for each of the sampling points for each pixel on the two-dimensional image; and linearly interpolating the attribute information on the four vertexes that configures the tetrahedron relevant to the pixel determined to be obtained and the sampling points of time, to obtain the rendering information for a motion blur image.

4. A method as claimed in claim 3, wherein each pixel on the two-dimensional image includes a plurality of sub-pixels, the linear processing is performed for all or part sub-pixels of the pixel, respectively, and pixel information on the pixel is obtained based on the rendering information.

5. A rendering apparatus rendering a motion blur image comprising:

a generating device configured to generate information concerning three vertexes in a two-dimensional triangle image as an object at two points of time, to acquire information concerning six vertexes;

a dividing device configured to divide into three tetrahedrons a triangular prism defined by the six vertexes in a three-dimensional space defined by a pixel coordinate axis and a time axis of the two-dimensional image; and a linear processing device configured to subject each of the three tetrahedrons to linear processing, to obtain rendering information for a motion blur image.

6. A rendering apparatus as claimed in claim 5, wherein the linear processing device includes a plurality of linear processors configured to execute in parallel a plurality of processes corresponding to the tetrahedrons, respectively.

7. A rendering apparatus as claim 5, which further include an additional dividing device configured to divide an N polygon (N is 4 or more) into (N−2) triangles and provide each of the (N−2) triangles to the generating device as the two-dimensional triangle image, when information on the N polygon is provided as the object.

8. A rendering apparatus rendering a motion blur image comprising:

a generating device configured to generate two-dimensional coordinate values of three vertexes of a two-dimensional triangle as an object at two points of time to acquire information concerning six vertexes and attribute information on each of the vertexes, the two-dimensional triangle being extracted from a projection image formed when a three-dimensional model is projected onto a two-dimensional plane;

a dividing device configured to divide into three tetrahedrons a triangular prism defined by the six vertexes in a three-dimensional space defined by a pixel coordinate axis of the two-dimensional image and a time axis; and a linear processing device configured to subject each of the tetrahedrons to linear processing in the three-dimensional space using four vertexes extracted from among the six vertexes and based on the two-dimensional coordinate values, the attribute information and the two points of time, to obtain rendering information for a motion blur image.

9. An apparatus as claimed in claim 8, wherein the linear processing device comprises:

means for obtaining one or more sampling points of time on the time axis in the three-dimensional space for each pixel on the two-dimensional image for one of the three tetrahedrons;

means for determining whether or not the rendering information should be obtained depending on whether or not each of sampling points in the three-dimensional space defined by the sampling points of time exist inside of the one of the tetrahedrons for each pixel; and a interpolating device configured to linearly interpolate the attribute information on the four vertexes that configures the one of the tetrahedrons and correspond to the pixel determined to be obtained and the sampling points of time, to obtain the rendering information for a motion blur image.

10. An apparatus as claimed in claim 9, wherein when each pixel on the two-dimensional image is formed of a plurality of sub-pixels, the linear processing device obtains the rendering information based on rendering information obtained by subjecting each of at lease some of the sub-pixels to linear processing.

11. A rendering apparatus as claimed in claim 9 or claim 8, wherein the linear processing device comprises:

means for obtaining the sampling points of time using plural types of array data for providing an image quality of a desired motion blur image; and means for enabling the contents of the array data to be externally written, and enabling external designation of whether or not any of the array data is used.

12. A rendering apparatus as claimed in claim 9, wherein the linear processing device comprising:

means for obtaining the sampling points of time using plural types of functions for providing an image quality of a desired motion blur image; and means for enabling coefficient data on the functions to be externally written, and enabling external designation of whether or not any of the functions is used.

13. A rendering apparatus as claimed in claim 9, wherein, when the interpolating device computes the rendering information of each pixel by linear interpolating, the interpolating device computes a difference between a pixel and a pixel whose value has been already obtained, in the pixel coordinate axis direction of the two-dimensional image, to obtain a value of another pixel.

14. A rendering apparatus as claimed in claim 9, wherein when the interpolating device computes the rendering information for each pixel by linear interpolating, the interpolating device computes a value of each pixel in the time axis direction by using a table including a predetermined value.

15. A rendering apparatus as claimed in claim 9, wherein when the interpolating device computes the rendering information for each pixel, the interpolating device computes a difference between a pixel and a pixel whose value has been already obtained, in the pixel coordinate axis direction of the two-dimensional image, to obtain a value of another pixel, and a value of each pixel in the time axis direction by using a table including a predetermined value.

16. A rendering apparatus as claimed in claim 9, wherein the linear processing device includes a plurality of linear processors configured to execute in parallel a plurality of processes corresponding to the tetrahedrons, respectively.

17. A rendering apparatus as claim 9, which further include an additional dividing device configured to divide an N polygon (N is 4 or more) into (N−2) triangles and provide each of the (N−2) triangles to the generating device as the two-dimensional triangle image, when information on the N polygon is provided as the object.

18. A computer program stored on a computer readable medium for rendering a motion blur image in a three-dimensional computer graphics, the computer program comprising:

instruction means for instructing a computer to generate first information concerning three vertexes in a two-dimensional triangle image as an object at two points of time to obtain second information concerning six vertexes;

instruction means for instructing the computer to divide into three tetrahedrons a triangular prism formed by the six vertexes in a three-dimensional space defined by a pixel coordinate axis of the two-dimensional triangle image and a time axis; and instruction means for instructing the computer to subject each of the three tetrahedrons to linear processing to obtain rendering information for a motion blur image.

* * * * *